US011878355B2

(12) United States Patent
Kelleher et al.

(10) Patent No.: US 11,878,355 B2
(45) Date of Patent: Jan. 23, 2024

(54) POWER TOOL CHUCK

(71) Applicant: BLACK & DECKER INC., New Britain, CT (US)

(72) Inventors: Joseph P. Kelleher, Parkville, MD (US); William F. Gallagher, Stewartstown, PA (US); Louis M. Vasiliades, Baltimore, MD (US); Trevor J. Koenig, Lancaster, PA (US); Heather Schafer, Street, MD (US)

(73) Assignee: BLACK & DECKER INC., New Britain, CT (US)

( * ) Notice: Subject to any disclaimer, the term of this patent is extended or adjusted under 35 U.S.C. 154(b) by 461 days.

(21) Appl. No.: 16/804,118

(22) Filed: Feb. 28, 2020

(65) Prior Publication Data

US 2020/0276650 A1 Sep. 3, 2020

Related U.S. Application Data

(60) Provisional application No. 62/812,431, filed on Mar. 1, 2019.

(51) Int. Cl.
*B23B 31/00* (2006.01)
*B23B 31/12* (2006.01)
B23B 31/107 (2006.01)

(52) U.S. Cl.
CPC ........ *B23B 31/1238* (2013.01); *B23B 31/008* (2013.01); *B23B 31/1072* (2013.01); *B23B 2231/38* (2013.01)

(58) Field of Classification Search
CPC .............. B23B 31/1238; B23B 31/008; B23B 2231/38; B23B 31/1246; B23B 31/1253; B23B 31/1207; B23Q 3/12
See application file for complete search history.

(56) References Cited

U.S. PATENT DOCUMENTS

| 2,285,101 | A | | 6/1942 | Stoner |
| 2,874,985 | A | | 2/1959 | March |
| 5,195,760 | A | * | 3/1993 | Wheeler ............. B23B 31/1253 |
| | | | | 279/60 |

(Continued)

FOREIGN PATENT DOCUMENTS

| DE | 102004042465 A | 3/2006 |
| DE | 102006035879 A | 3/2007 |

(Continued)

*Primary Examiner* — Eric A. Gates
*Assistant Examiner* — Reinaldo A Vargas Del Rio
(74) *Attorney, Agent, or Firm* — Stephen R. Valancius

(57) ABSTRACT

A power tool chuck includes a body with a central bore extending along an axis and configured to receive a tool bit, a plurality of angled passageways, and a plurality of jaws received in the passageways and moveable between an axially forward and radially inward clamping position and an axially rearward and radially outward retracted position. At least one jaw has a rear end lying in a first plane transverse to the axis. A first key drive member coupled to a tail portion of the body is configured to be engaged by a second key drive member on a power tool output shaft to non-rotationally couple the body to the output shaft. The first key drive has a forward end lying in a second plane transverse to the axis. The second plane is axially forward of the first plane when the jaws are in the retracted position.

24 Claims, 20 Drawing Sheets

(56) References Cited

U.S. PATENT DOCUMENTS

| | | | |
|---|---|---|---|
| 6,637,756 B2 * | 10/2003 | McCurry | B23B 31/1253 |
| | | | 279/902 |
| 7,112,021 B2 | 9/2006 | Pantzar | |
| 7,131,802 B2 | 11/2006 | Pantzar | |
| 7,189,039 B2 | 3/2007 | Pantzar | |
| 7,270,506 B2 | 9/2007 | Guy | |
| 8,573,912 B2 | 11/2013 | Dudzinsky | |
| 8,714,566 B2 | 5/2014 | Campbell et al. | |
| 10,118,281 B2 * | 11/2018 | Yeoh | B25B 21/02 |
| 2007/0200302 A1 | 8/2007 | Cachod | |

FOREIGN PATENT DOCUMENTS

| | | |
|---|---|---|
| DE | 102012211907 A | 1/2014 |
| EP | 1685917 B1 | 8/2006 |

* cited by examiner

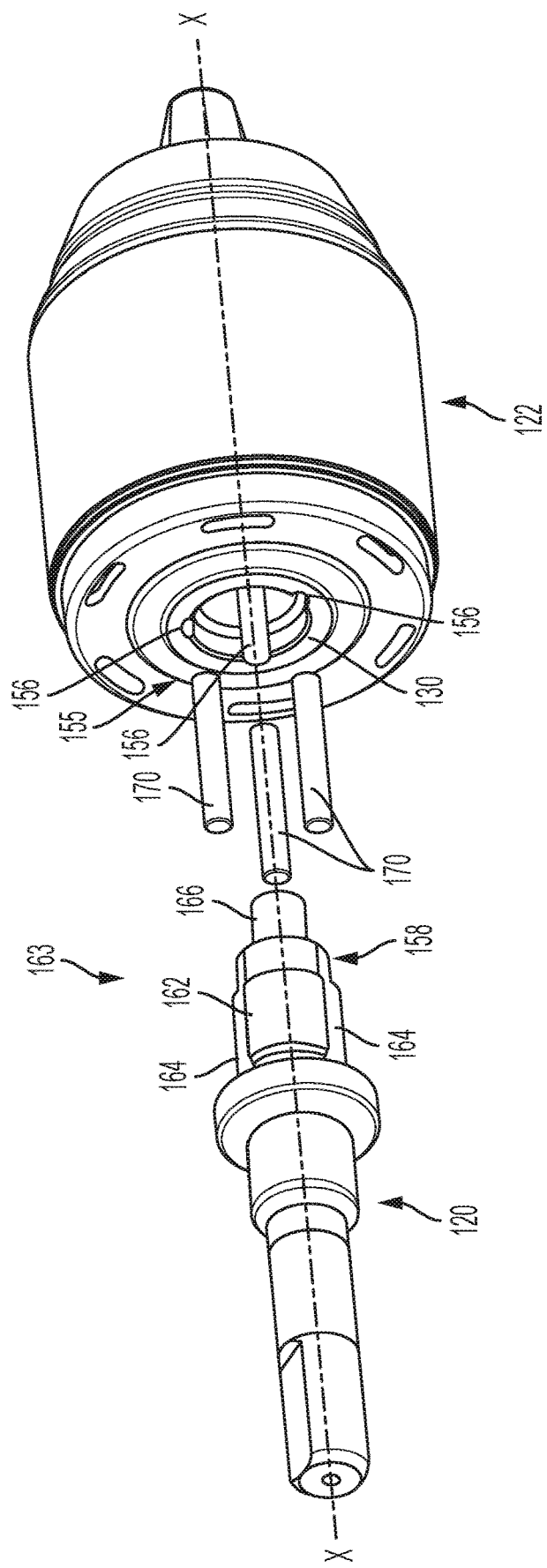

POWER TOOL CHUCK

RELATED APPLICATIONS

This application claims priority, under 35 U.S.C. § 119(e), to U.S. Provisional Patent Application No. 62/812,431, filed Mar. 1, 2019, titled "Chuck for Power Tool," which is incorporated by reference.

TECHNICAL FIELD

This application relates to a chuck for a power tool, such as a drill, a driver, a screwdriver, or a hammer drill.

BACKGROUND

A chuck may be non-rotationally coupled to an output shaft of a power tool (such as a drill, a driver, a screwdriver, or a hammer drill) in a variety of ways. In one embodiment, e.g., as disclosed in U.S. Pat. No. 5,193,824 (which is incorporated by reference), a chuck body may be provided with a female threaded axial bore so that the chuck may be mounted onto a male threaded end portion of the shaft. However, the threaded connection can loosen during operation of the power tool and has limited torque transmission ability based on the size and pitch of the threads. In another embodiment, e.g., as disclosed in U.S. Pat. No. 2,874,985 (which is incorporated by reference), a chuck body may be provided with a diametrically oriented rear slot that is engaged by a diametrically oriented projection on the output shaft. However, this design requires an axially lengthened chuck body so that the body has sufficient axial length for the slot and the chuck jaw passages.

SUMMARY

In an aspect, a chuck for a power tool includes a body extending along a longitudinal axis and having a nose portion and a tail portion. A central bore is defined in the body and is open to the nose portion. The central bore extends along a longitudinal axis and is configured to receive a tool bit. A plurality of angled passageways is defined in the body in communication with the central bore, with each passageway disposed at an angle to the longitudinal axis. A plurality of jaws each are at least partially received in one of the passageways. At least one of the jaws has a rear end lying in a first plane transverse to the longitudinal axis. The jaws are moveable in the passageways between an axially forward and radially inward clamping position to clamp a tool bit received in the central bore, and an axially rearward and radially outward retracted position. A first key drive member is coupled to the tail portion of the body and configured to be engaged by a second key drive member on an output shaft of a power tool to non-rotationally couple the body to the output shaft. The first key drive member extends axially from a rearward end to a forward end that lies in a second plane transverse to the longitudinal axis. The second plane is axially forward of the first plane when the jaws are in the retracted position.

Implementations of this aspect may include one or more of the following features. The first key drive member may include a recess defined in the tail portion of the body. The recess may be angularly spaced from each of the passageways. The recess may include a radial slot that extends radially outward from the longitudinal axis. The radial slot may have side walls and a base wall extending transverse to the longitudinal axis and lying in the second plane. The radial slot may be configured to be engaged by a radial projection on the output shaft of the power tool. The radial slot may include a plurality of the radial slots, such as three radial slots arranged in a Y-shaped configuration.

The recess may include an axial slot having a front end that lies in the second plane. The first key drive member may further include a pin received in the axial slot and that is received in a second slot in the output shaft of the power tool. The axial slot may include a bore that receives a projection on the output shaft of the power tool. The axial slot may include a plurality of axial slots, such as two or three axial slots equal angularly spaced about the longitudinal axis. The first key drive member may include a projection coupled to the tail portion of the body configured to engage a recess on the output shaft of the power tool. The projection may extend from a base wall that lies in the second plane. The passageways may be angularly spaced about the longitudinal axis and the first key drive member may include a plurality of first key drive members angularly spaced about the longitudinal axis and each spaced from the passageways.

An outer sleeve may be rotatably received over the body and configured to be rotated in a clamping direction to cause the jaws to move toward the clamping position and to be rotated in an opposite release position to cause the jaws to move toward the retracted position. A fixation device may be configured to couple the body to the output shaft to inhibit axial movement of the body relative to the output shaft. The fixation device may include a screw configured to be received through the central bore and to be threaded into a threaded opening in the output shaft of the power tool. Each passageway may be open to the tail portion of the body. Each jaw may be retracted axially rearwardly beyond the tail portion of the body.

In another aspect, a power tool includes a housing, a motor received in the housing, a switch configured to selectively actuate the motor, and an output shaft having a front end, extending along a longitudinal axis, and configured to be rotationally driven by the motor. A chuck is configured to be coupled to the output shaft. The chuck includes a body extending along a longitudinal axis and having a nose portion and a tail portion. A central bore is defined in the body and open to the nose portion. The central bore extends along a longitudinal axis and is configured to receive a tool bit. A plurality of angled passageways is defined in the body in communication with the central bore. Each passageway is disposed at an acute angle to the longitudinal axis. A plurality of jaws each are at least partially received in one of the passageways. A rear end of at least one of the jaws lies in a first plane transverse to the longitudinal axis. The jaws are moveable in the passageways between an axially forward and radially inward clamping position to clamp a tool bit received in the central bore, and an axially rearward and radially outward retracted position. A first key drive member is coupled to the tail portion of the body and a second key drive member is coupled to the output shaft. The first and second key drive members are configured to engage each other to non-rotationally couple the body to the output shaft so that rotation of the output shaft causes rotation of the body. The first key drive member extends from a rearward end to a forward end that lies in a second transverse plane transverse to the longitudinal axis. The second plane is axially forward of the first plane when the jaws are in the retracted position.

Implementations of this aspect may include one or more of the following. The first key drive member may include a recess defined in the tail portion of the body. The recess may be angularly spaced from each of the passageways. The recess may include a radial slot that extends radially outward from the longitudinal axis. The radial slot may have side walls and a base wall extending transverse to the longitudinal axis and lying in the second plane. The second key drive member may include a radial projection configured to engage the radial slot. The radial slot may include a plurality of the radial slots, such as three radial slots arranged in a Y-shaped configuration.

The recess may include an axial slot that lies in the second plane. The first key drive member may include a pin that is received in the axial slot and the second key drive member may include a second slot in the output shaft that receives the pin. The axial slot may include a bore, and the second key drive member may include a projection on the output shaft that is received in the bore. The axial slot may include a plurality of axial slots, such as two or three axial slots equal angularly spaced about the longitudinal axis. The first key drive member may include a projection coupled to the tail portion of the body and the second key drive member may include a recess on the output shaft configured to be engaged by the projection. The projection may extend from a base wall that lies in the second plane. The passageways may be angularly spaced about the longitudinal axis and the first key drive member may include a plurality of first key drive members angularly spaced about the longitudinal axis and each angularly spaced from the passageways.

An outer sleeve may be rotatably received over the body and configured to be rotated in a clamping direction to cause the jaws to move toward the clamping position and to be rotated in an opposite release position to cause the jaws to move toward the retracted position. A fixation device may be configured to couple the body to the output shaft to inhibit axial movement of the body relative to the output shaft. The fixation device may include a threaded opening in the output shaft and a screw configured to be received through the central bore and to be threaded into the threaded opening. Each passageway may be open to the tail portion of the body. Each jaw may be retracted rearwardly beyond the tail portion of the body.

Advantages may include one or more of the following. The first key drive member on the chuck and the second key drive member on the output shaft provide more reliable torque transmission than a threaded connection, which improves torque transmission from the output shaft to the chuck. Also, the rear ends of the jaws lying in a first plane and the second key drive member having a front end lying in a second plane that is axially forward of the first plane when the jaws are in the retracted position reduces the axial length of the chuck body. These and other advantages and features will be apparent from the description, the drawings, and the claims.

BRIEF DESCRIPTION OF THE DRAWINGS

FIG. 9 is an exploded view of another embodiment of an output shaft of a power tool and a chuck.

DETAILED DESCRIPTION

Figure 1:
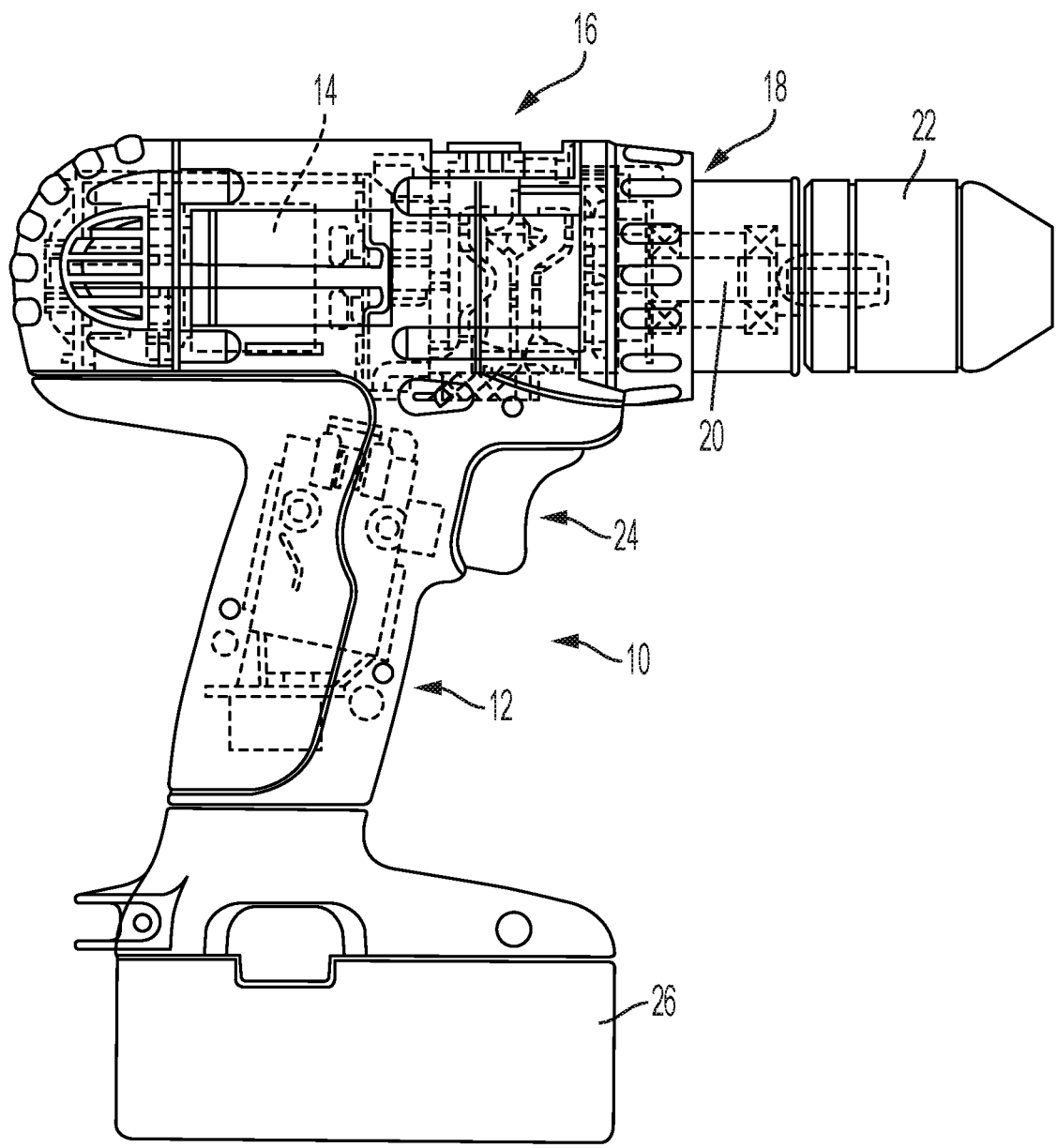
FIG. 1 is a side view of an embodiment of a power tool and a chuck.
Figure 2:
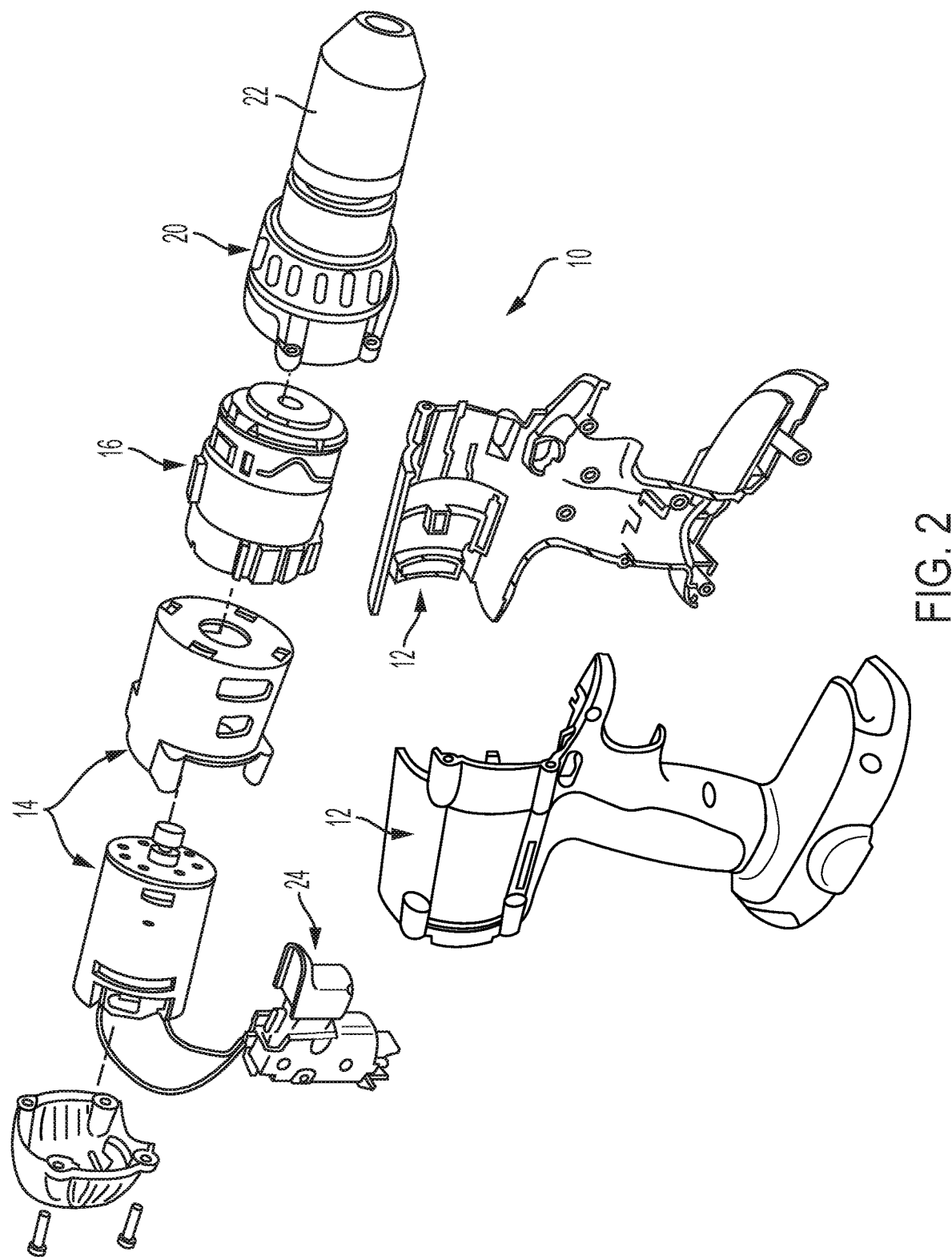
FIG. 2 is an exploded view of the power tool and chuck of FIG. 1.
Figure 3:
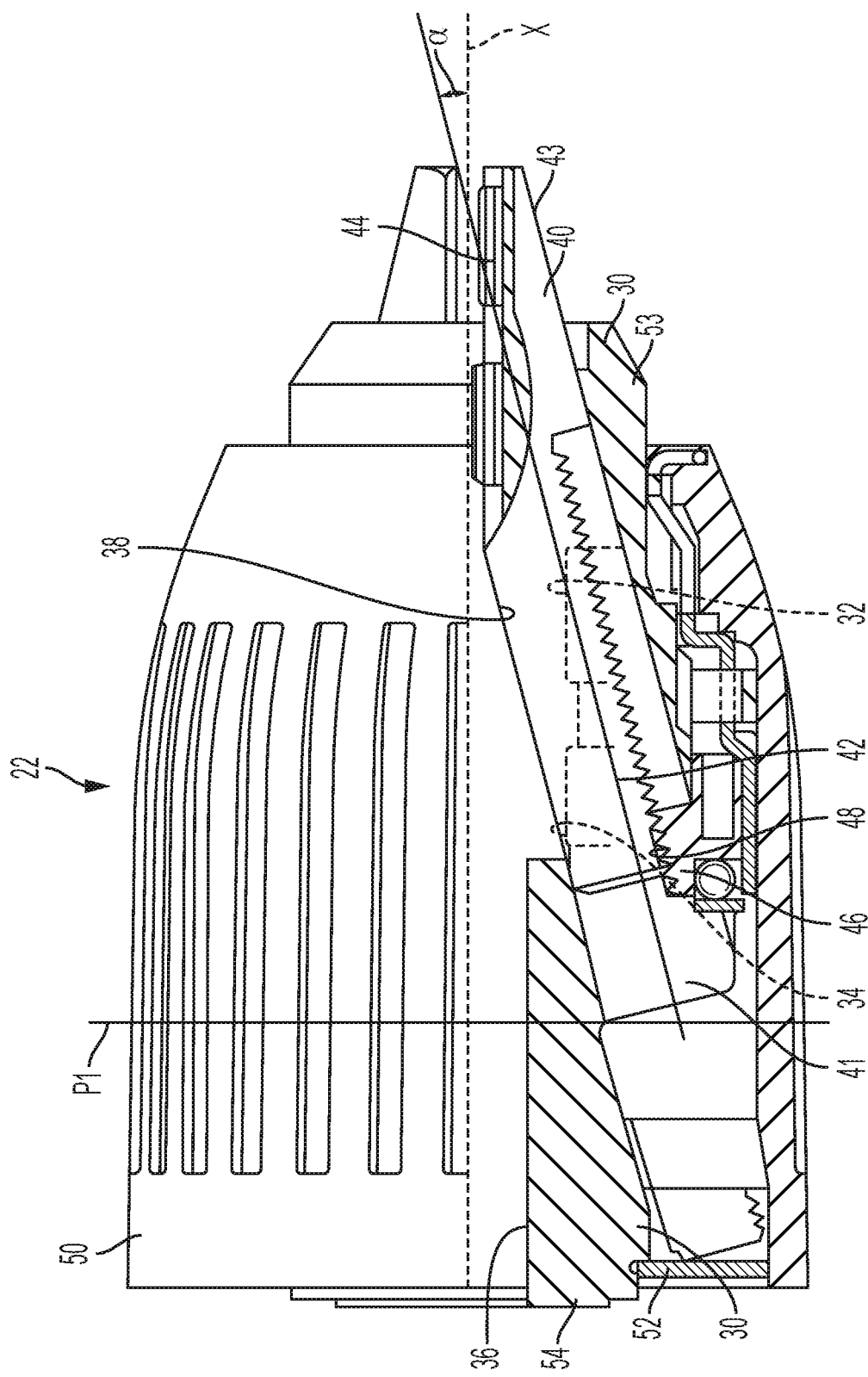
FIG. 3 is a side view, partially in cross-section, of the chuck of FIG. 1.

Referring to FIGS. 1 and 2, a power tool 10 (such as a drill, a driver, a screwdriver, or a hammer drill) has a housing 12, a motor 14, a transmission 16, a clutch 18, an output shaft 20, a chuck 22, a trigger 24 and a battery pack 26. Rotational power is transmitted from the motor 14 to the chuck 22 via the transmission 16, the clutch 18, and the output shaft 20. The motor 14, the transmission 16, the clutch 18, the trigger 24, and the battery pack 26 are of known designs and need not be described in significant detail in this application. Reference may be made to a variety of publications for a more complete understanding of the operation of these features, such as U.S. Pat. Nos. 5,897,454 and 7,220,211, which are incorporated by reference.

Referring also to FIGS. 3-8, the chuck 22 has a chuck body 30 with a central bore 32 centered on a longitudinal axis X. The body 30 has a front nose portion 53 and a rear tail portion 54. The central bore 32 has a front portion 34 configured to receive a tool bit therein, and a rear portion 36 configured to be fitted on the output shaft 20 (as described in more detail below). The body defines a plurality of (e.g., three) angled passageways 38 in communication with the central bore 32. Each passageway 38 is disposed at an acute angle α to the longitudinal axis X. The passageways 38 are equal angularly spaced about the longitudinal axis X (e.g., spaced at 120° intervals).

A plurality of (e.g., three) jaws 40 are each at least partially received in one of the passageways 38. Each jaw 40 has a rear end 41 with a threaded portion 42 and a front end 43 with a clamping surface 44 configured to clamp a tool bit received in the central bore 32. The rear end 41 of at least one of the jaws 40 lies in a first plane P1 that is transverse to the longitudinal axis X. In an embodiment, the rear ends 41 of all the jaws 40 are co-planar and lie in the first plane P1. In another embodiment, the rear ends of the jaws 40 are not co-planar and the first plane P1 is defined by the rearmost rear end 41 of the jaws 40. A tightening ring or nut 46 is rotatably received about the body 30 and has an internal screwthread 48 that meshes with the threaded portion 42 of each of the jaws 40. An outer sleeve 50 is rotatably received over the body 30 and is engaged with the nut 46 so that rotation of the outer sleeve 50 at least selectively causes rotation of the nut 46. A rear cover 52 is coupled to a rear end 54 of the body 30.

When the sleeve 50 is rotated in a tightening direction, it causes the nut 46 to rotate in the tightening direction. The threaded coupling of the nut 46 with the jaws 40 cause the jaws to move axially forward and radially inward toward one another to a clamping position to clamp a tool bit between their clamping surfaces 44. When the sleeve 50 is rotated in the opposite loosening direction, it causes rotation of the nut 46 in the same direction, which causes the jaws 40 to move axially rearward and radially outward to a retracted position to release a tool bit clamped between their clamping surfaces 44. Further details about the operation of the chuck 22 to clamp and unclamp a tool bit can be found, e.g., in U.S. Pat. No. 5,765,839, which is incorporated by reference.

Figure 8:
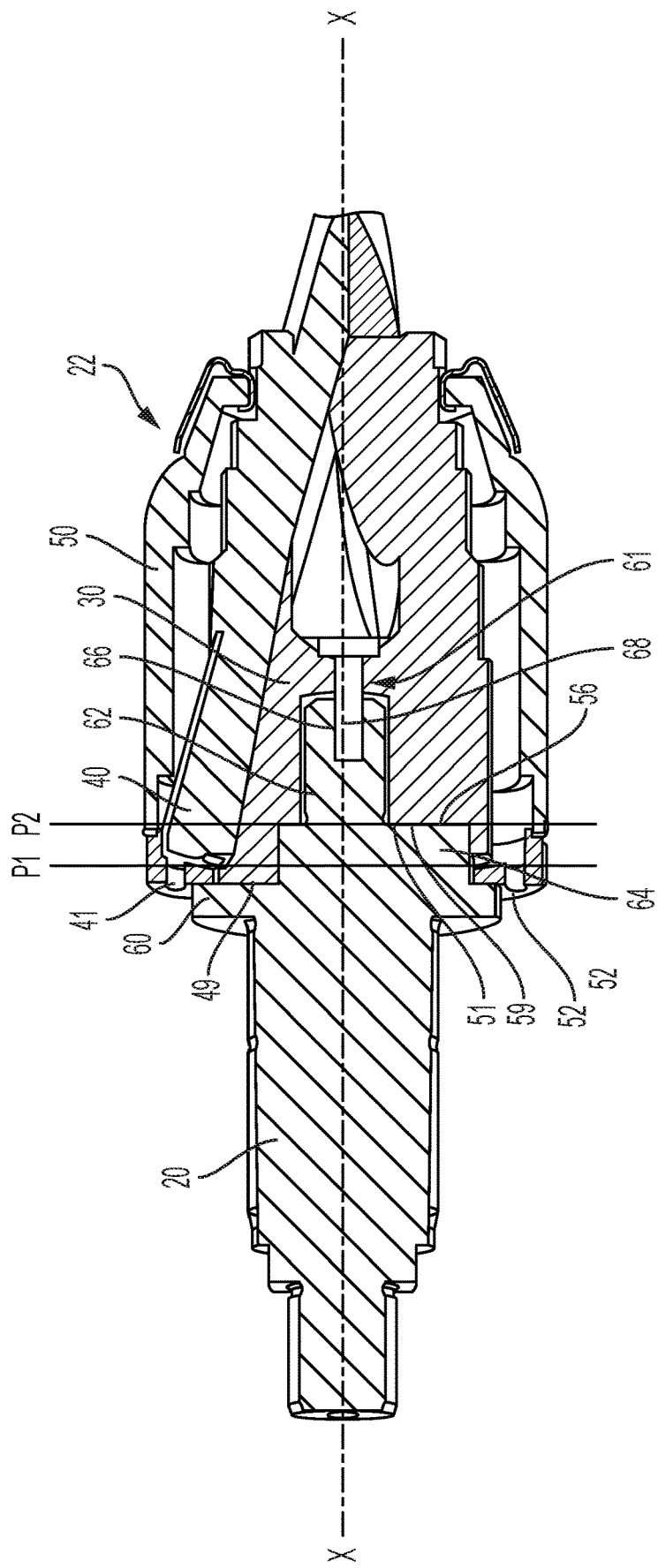
FIG. 8 is a cross-sectional view of the output shaft coupled to the chuck of FIG. 1.
Figure 11:
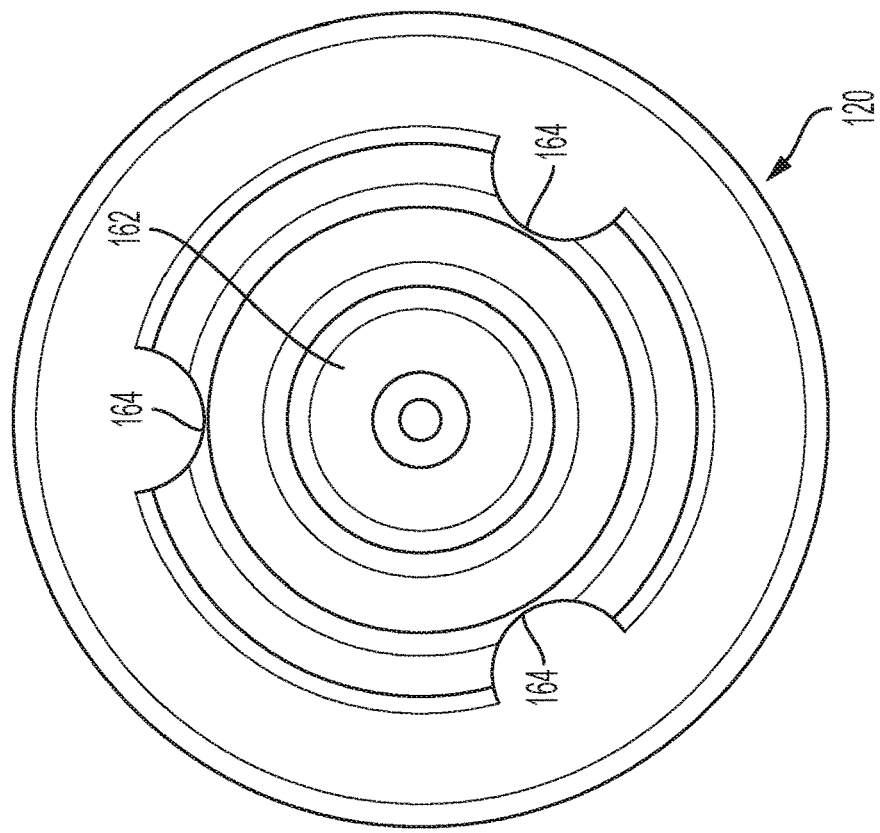
FIG. 11 is a front view of the output shaft of the power tool of FIG. 9.
Figure 10:
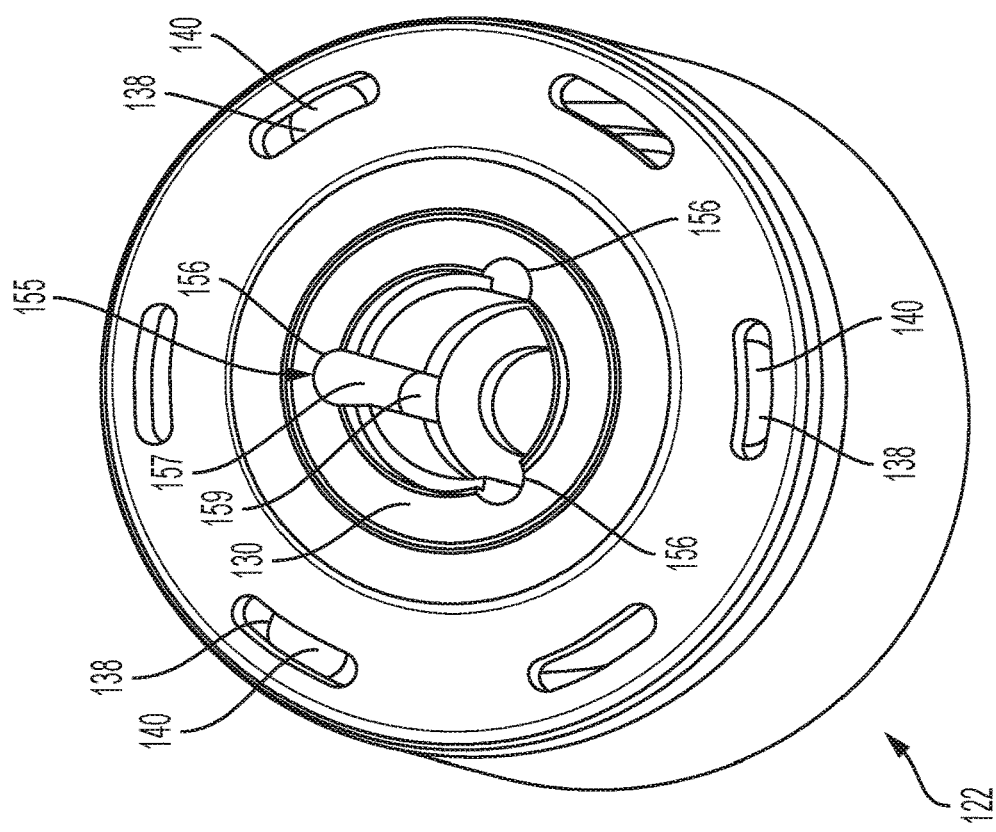
FIG. 10 is a rear perspective view of the chuck of FIG. 9.
Figure 12:
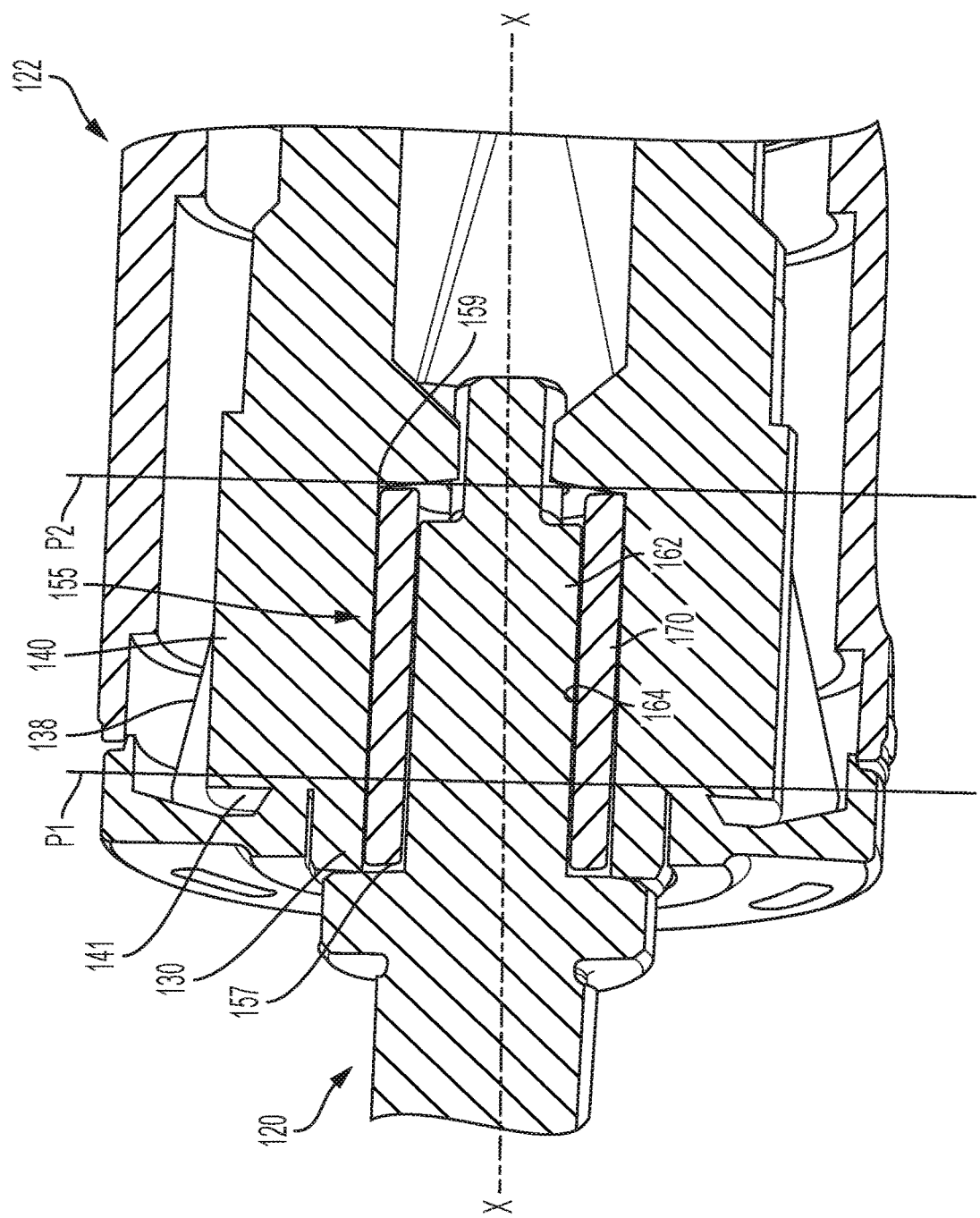
FIG. 12 is a cross-sectional view of the output shaft and chuck of FIG. 9.

The tail portion 54 of the body 30 defines a first key drive member 55 and the front end 58 of the output shaft 20 defines a second key drive member 63. The first and second key drive members 55, 63 are configured to engage each other to non-rotationally couple the body 30 to the output shaft 20 so that rotation of the output shaft 20 causes rotation of the body 30. The first key drive member 55 extends axially from a rear end 49 to a front end 51. The front end 51 of the first key drive member 55 lies in a second plane P2 that is transverse to the longitudinal axis X. As shown in FIG. 8, when the jaws 40 are in the retracted position the second plane P2 is axially forward of the first plane P1.

Figure 5:
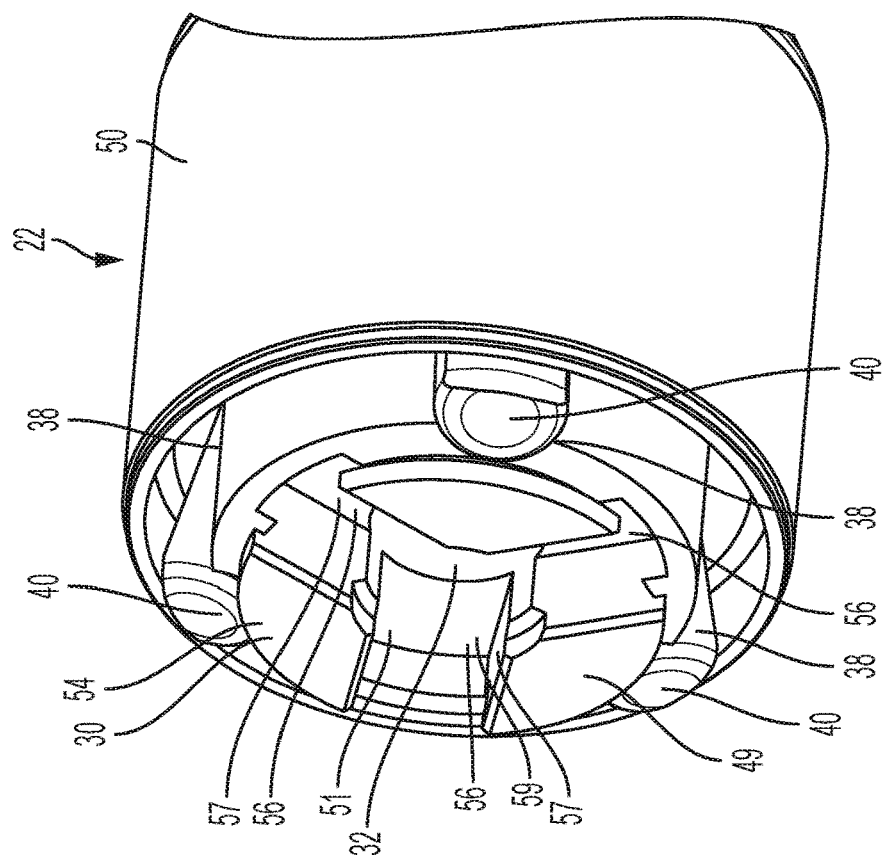
FIG. 5 is a rear perspective view of the chuck of FIG. 1 with its rear cover removed.
Figure 4:
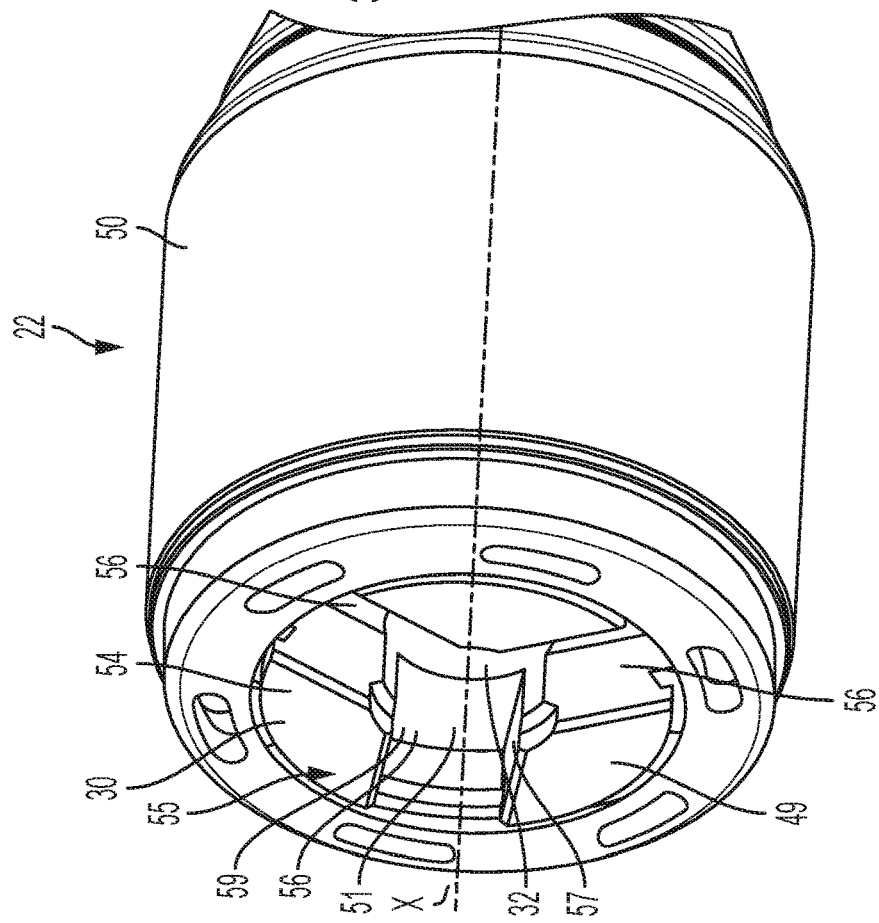
FIG. 4 is a rear perspective view of the chuck of FIG. 1.
Figure 6:
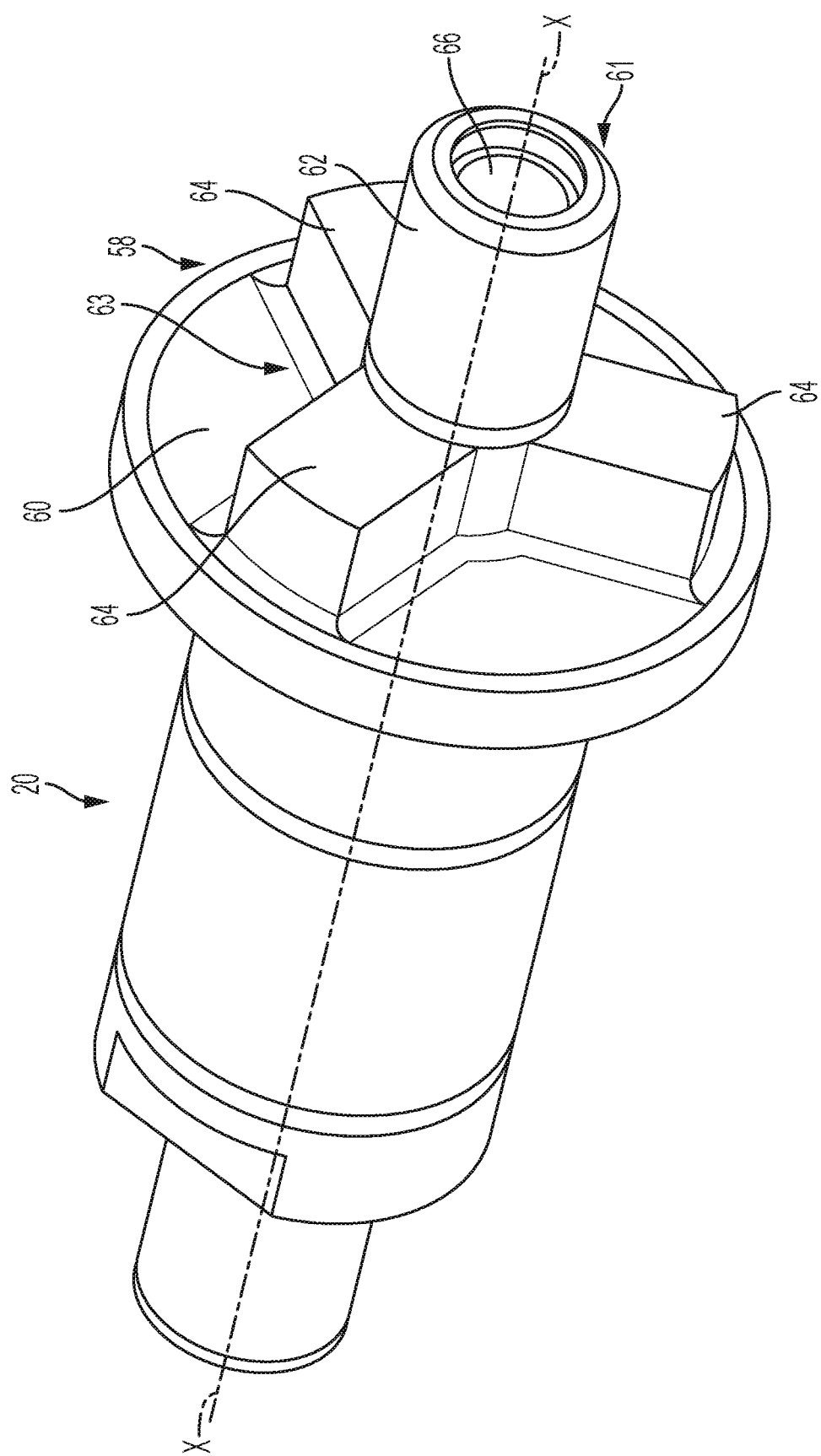
FIG. 6 is a perspective view of the output shaft of the power tool of FIG. 1.
Figure 7:
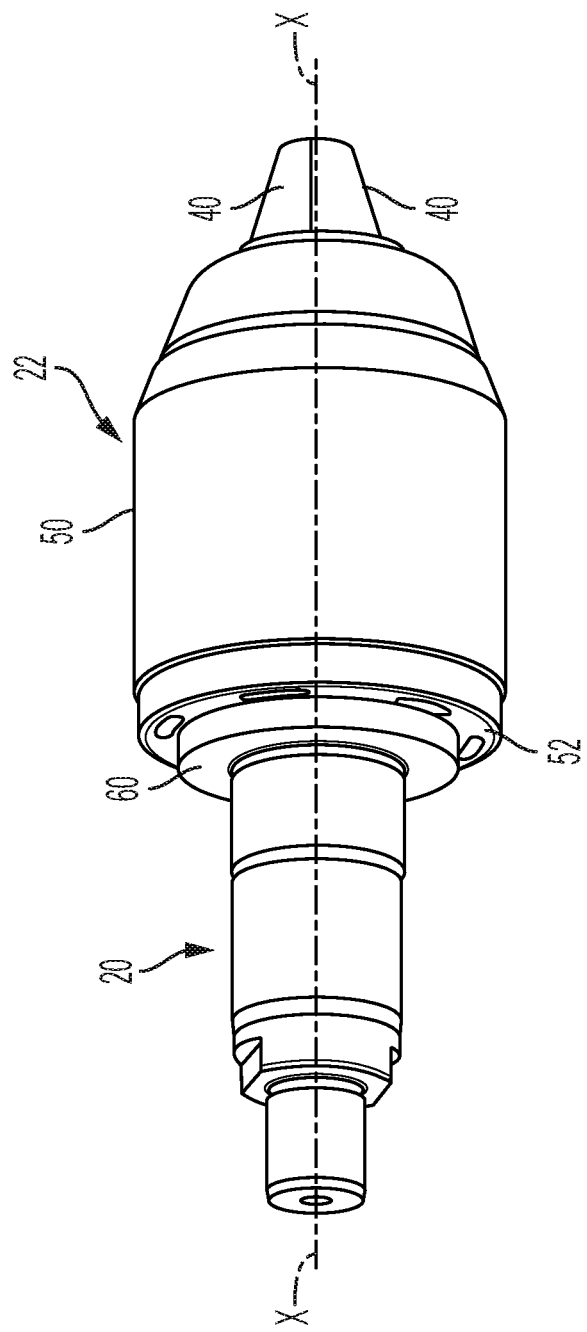
FIG. 7 is a perspective view of the output shaft coupled to the chuck of FIG. 1.

In the embodiment of FIGS. 3-8, the first key drive member 55 comprises a one or more (e.g., three) radial slots 56 that extend radially outward from the central bore 32. Each slot 56 is defined by side walls 57 that are parallel to the longitudinal axis X and a base wall 59 that is transverse to the longitudinal axis X and that lies in the second plane P2. In another embodiment, the side walls 57 may be non-parallel to the longitudinal axis (e.g., so that they taper toward one another). The slots 56 each are angularly spaced about the longitudinal axis from each other and from each of the angled passageways 38 that receive the jaws 40. For example, the radial slots 56 may be equal angularly spaced about the longitudinal axis X (e.g., spaced at 120° intervals) with each slot spaced equal angularly from each of the passageways 38 (e.g., by 60°) so that the slots 56 are arranged in a Y-shaped configuration. Angularly spacing the slots 56 from the passageways 38 enables the rear ends 41 of the jaws 40 to be retracted axially rearward of the second plane P2 without the jaws 40 extending into the slots 56. In addition, as shown in FIG. 5, in an embodiment, each passageway 38 may be open to the rear end 54 of body 30 and the jaws 40 may be retracted beyond the rear end 54 of the body 30 into the sleeve. These features enable better torque transmission from the output shaft 20 to the body 30, while also reducing the axial length of the body 30 and of the chuck 22.

The second key drive member 63 includes at least one (e.g., three) radial projections 64 disposed on a front face of an optional flange 60 on the front end 58 of the output shaft 20. Each radial projection 64 extends radially outward from an optional central protrusion 62, which extends axially forward of the flange 60 along the longitudinal axis X. The projections 64 may be equal angularly spaced about the longitudinal axis by the same angular distance as the radial slots 56 of the first key drive member 55 (e.g., spaced at 120° intervals), so that the projections 64 may engage the slots 56 to non-rotationally couple the chuck 22 to the output shaft 20.

The chuck body 30 and the output shaft 20 may further include an axial fixation device 61 device configured to axially couple the chuck body 30 to the output shaft 20 to inhibit axial movement of the chuck 22 relative to the output shaft 20. In the embodiment of FIGS. 3-8, the axial fixation device 61 includes a threaded opening 66 defined in the central protrusion 62 and extending along the longitudinal axis X, and a threaded screw 68 that is received through the central bore 32 in the body 30 and is threaded into the threaded opening 66 in the shaft 20.

To couple the chuck 22 to the output shaft 20, the central protrusion 62 and the radial projections 64 on the shaft are received in the central bore 32 and the radial slots 56 in the chuck body 30. The radial projections 64 and radial slots 56 cause the chuck 22 to be non-rotationally coupled to the shaft 20 so that rotation of the shaft 20 causes rotation of the chuck 22. The chuck screw 68 is received through the central bore 32 in the body 30 and is threaded into the threaded opening 66 in the shaft 20 to prevent axial movement of the chuck 22 relative to the shaft 20.

Referring to FIGS. 9-12, in another embodiment, an output shaft 120 of a power tool and a chuck 122 have a similar design to the output shaft 20 and chuck 22 of FIGS. 3-8. The chuck 122 has a chuck body 130 with jaws 140 moveable in angled passageways 138 between a front clamping position and a rear retracted position (similar to the body 30 and jaws 40 of the chuck 22 of FIGS. 3-8). Each jaw 140 has a rear end 141 with a threaded portion 142 and a front end 143 with a clamping surface 144 configured to clamp a tool bit received in the central bore 132. The rear end 141 of at least one of the jaws 140 lies in a first plane P1 that is transverse to the longitudinal axis X. In an embodiment, the rear ends 141 of all the jaws 140 are co-planar and lie in the first plane P1. In another embodiment, the rear ends of the jaws 140 are not co-planar and the first plane P1 is defined by the rearmost rear end 141 of the jaws 140. The output shaft 120 has a front end 158 with a radial flange 160 and a central protrusion 166 (similar to the front end 58 with a radial flange 60 and central protrusion 66 of the output shaft 20 of FIGS. 3-8). The chuck body 130 includes a first key drive member 155 and the output shaft 130 includes a second key drive member 163 that differ from the first key drive member 55 and second key drive member 163 of FIGS. 3-8 as follows.

The first key drive member 155 includes one or more (e.g., three) axial slots 156 in the body 130 and one or more (e.g., three) axial pins 170 that extend parallel to the longitudinal axis X. In another embodiment, the pins are at an angle or tapered relative to the longitudinal axis X. The axial slots 156 and the axial pins 170 each extend axially from a rear end 157 to a front end 159. The front ends 159 lie in a second plane P2 that is axially forward of the first plane P1 (in which at least one of the rear ends 141 of the jaws 140 lie) when the jaws 140 are in their retracted position. The slots 156 and pins 170 each are angularly spaced from each other (e.g., equal angularly spaced by 120°) and from each of the angled passageways 138 (e.g., by 60°). Angularly spacing the slots 156 and pins 170 from the passageways 138 enables the rear ends 141 of the jaws 140 to be retracted axially rearward of the second plane P2 without the jaws 140 extending into the slots 156. This reduces the overall axial length of the body 130 and the chuck 122.

The second key drive member 163 includes at least one (e.g., three) axial recesses 164 disposed on the central protrusion 164 of the output shaft 120. The axial recesses 164 are angularly spaced about the longitudinal axis X (e.g., equal angularly spaced at 120° intervals). The recesses 165 are each configured to receive one of the pins 170 of the first key drive member 155 to non-rotationally couple the body 130 to the output shaft 120. The output shaft 120 may be axially coupled to the chuck body 130 by a chuck screw, similar to the embodiment of FIGS. 3-8.

Figure 13:
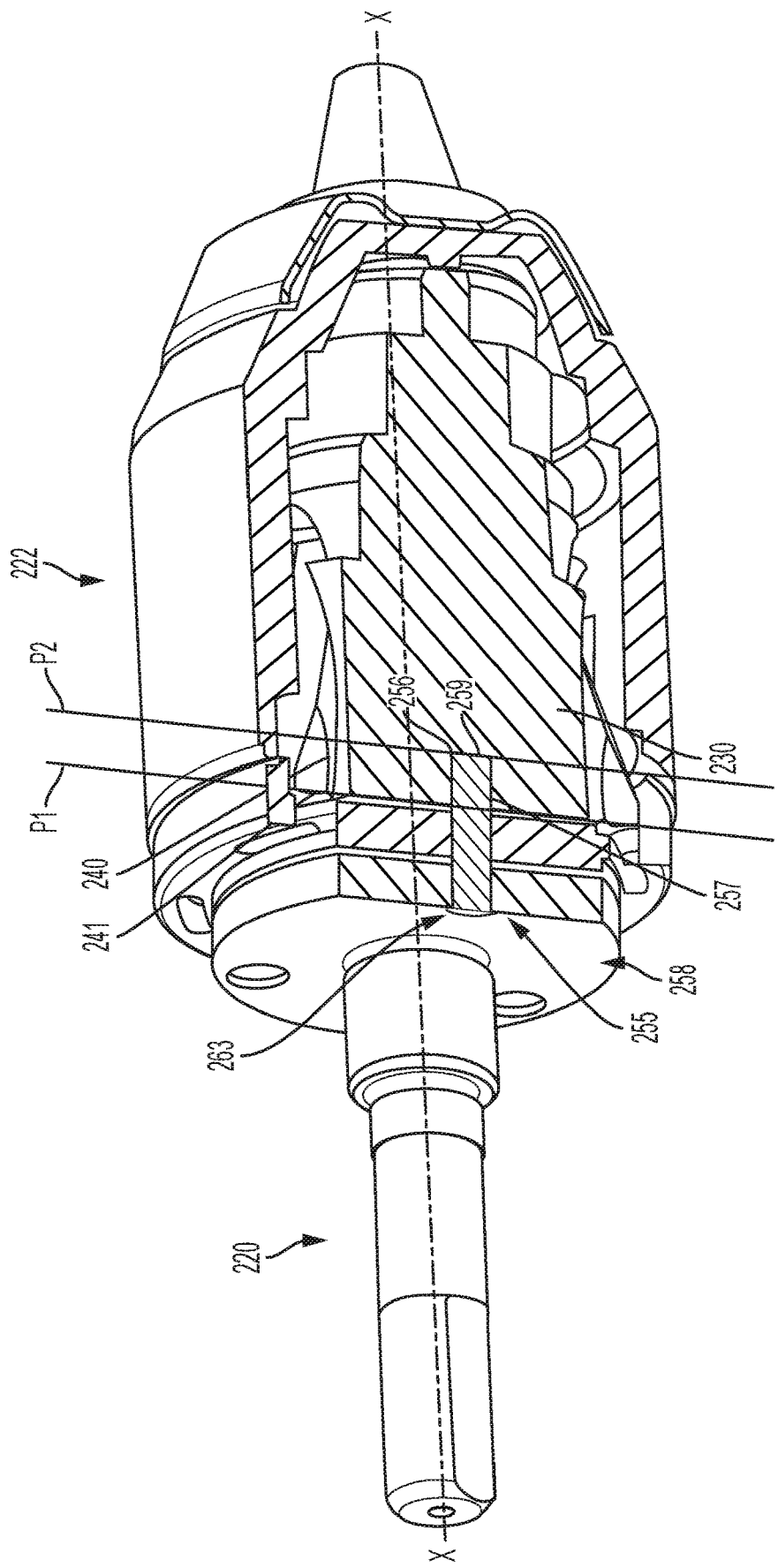
FIG. 13 is a perspective view, partially in cross-section, of another embodiment of an output shaft of a power tool and a chuck.
Figure 15:
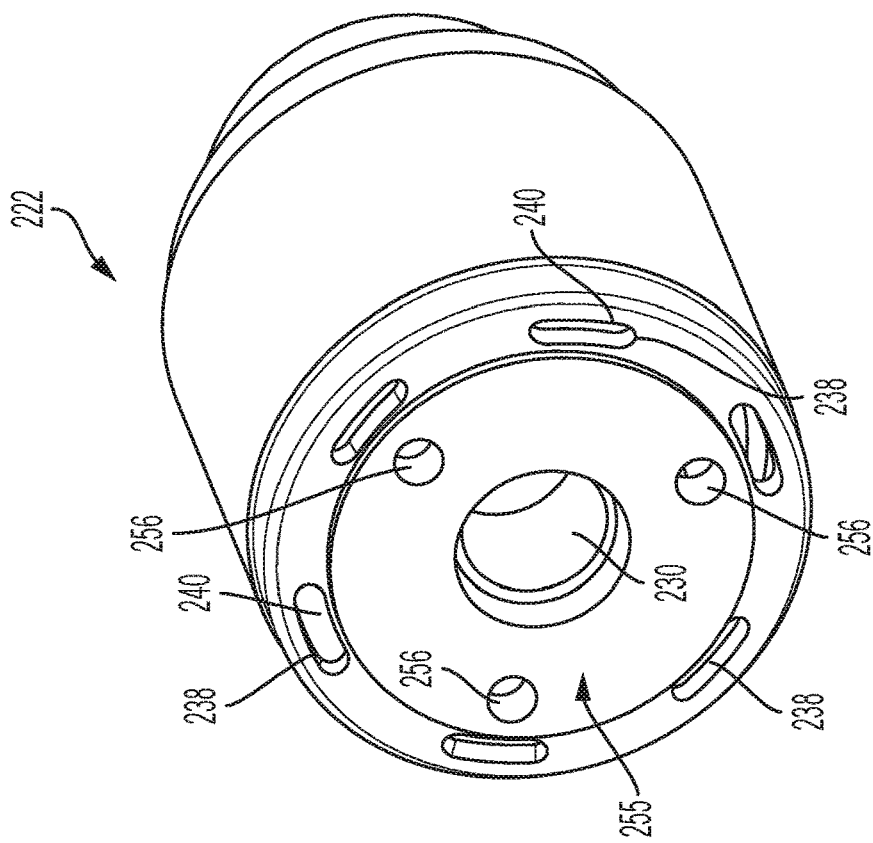
FIG. 15 is a rear perspective view of the chuck of FIG. 13.
Figure 14:
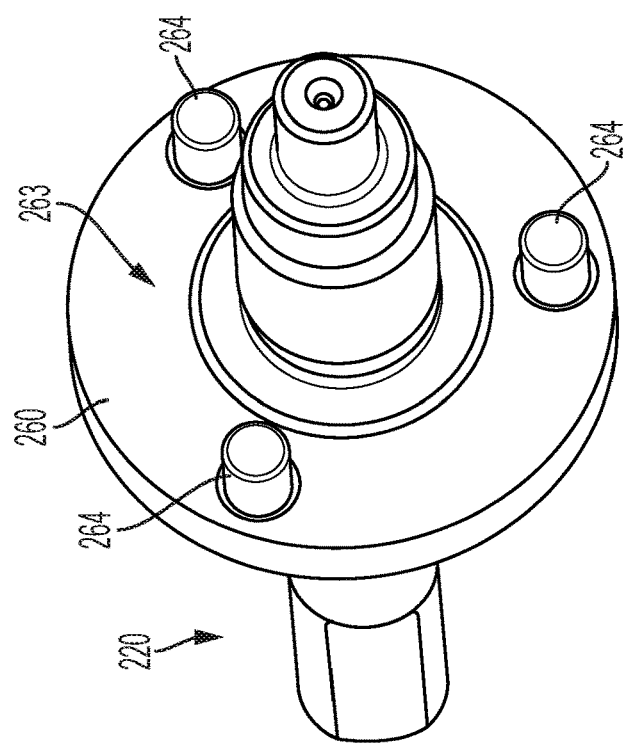
FIG. 14 is a front perspective view of the output shaft of FIG. 13.

Referring to FIGS. 13-15, in another embodiment, an output shaft 220 of a power tool and a chuck 222 have a similar design to the output shaft 20 and chuck 22 of FIGS. 3-8. The chuck 222 has a chuck body 230 with jaws 240 moveable in angled passageways 238 between a front clamping position and a rear retracted position (similar to the body 30 and jaws 40 of the chuck 22 of FIGS. 3-8). Each jaw 240 has a rear end 241 with a threaded portion 242 and a front end 243 with a clamping surface 244 configured to clamp a tool bit received in the central bore 232. The rear end 241 of at least one of the jaws 240 lies in a first plane P1 that is transverse to the longitudinal axis X. In an embodiment, the rear ends 241 of all of the jaws 240 are co-planar and lie in the first plane P1. In another embodiment, the rear ends of the jaws 240 are not co-planar and the first plane P1 is defined by the rearmost rear end 241 of the jaws 240. The output shaft 220 has a front end 258 with a radial flange 260 and an optional central protrusion 266 (similar to the front end 58 with a radial flange 60 and central protrusion 66 of the output shaft 20 of FIGS. 3-8). The chuck body 230 includes a first key drive member 255 and the output shaft 230 includes a second key drive member 263 that differ from the first key drive member 55 and second key drive member 163 of FIGS. 3-8 as follows.

The first key drive member 255 comprises one or more (e.g., three) axial bores 256 in the body 230 that extend parallel to the longitudinal axis X from a rear end 257 to a front end 259 that lies in a second plane P2. In another embodiment, the bores 256 may be tapered or angled relative to the longitudinal axis. The second plane P2 is axially forward of the first plane P1 when the jaws 240 are in their retracted position. The bores 256 each are angularly spaced from each other (e.g., equal angularly spaced at 120° intervals) and from each of the angled passageways 238 (e.g., by 60°). Angularly spacing the bores 256 from the passageways 238 enables the rear ends 241 of the jaws 240 to be retracted axially rearward of the second plane P2 without the jaws 240 extending into the bores 256. This reduces the overall axial length of the body 230 and the chuck 222.

The second key drive member 263 comprises at least one (e.g., three) axial pins 264 disposed on the radial flange 260 of the output shaft 220. The axial pins 264 are each configured to be received in one of the axial bores 256 of the first key drive member 255 to non-rotationally couple the body 230 to the output shaft 220. The pins 264 may be equal angularly spaced about the longitudinal axis by the same angular distance as the bores 256 (e.g., spaced at 120° intervals).

Figure 16:
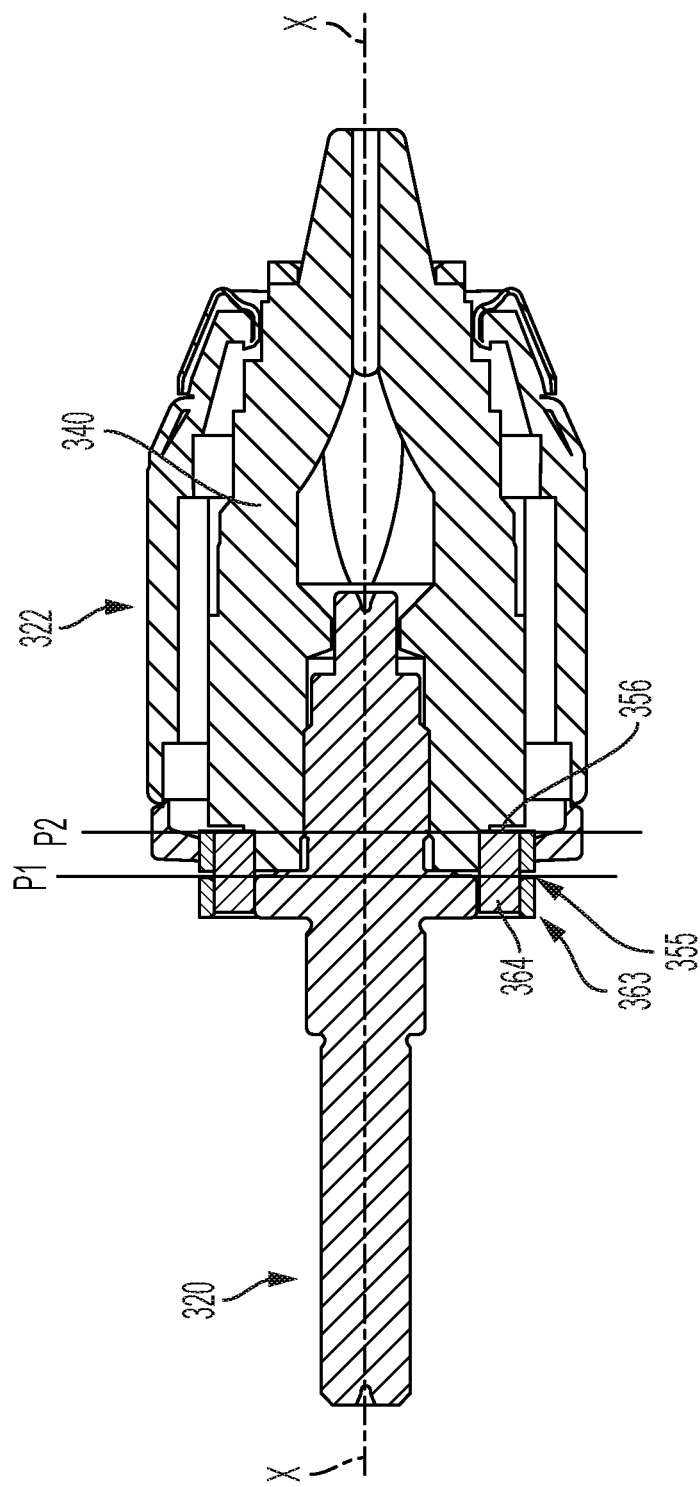
FIG. 16 is a cross-sectional view of another embodiment of an output shaft of a power tool and a chuck.
Figure 18:
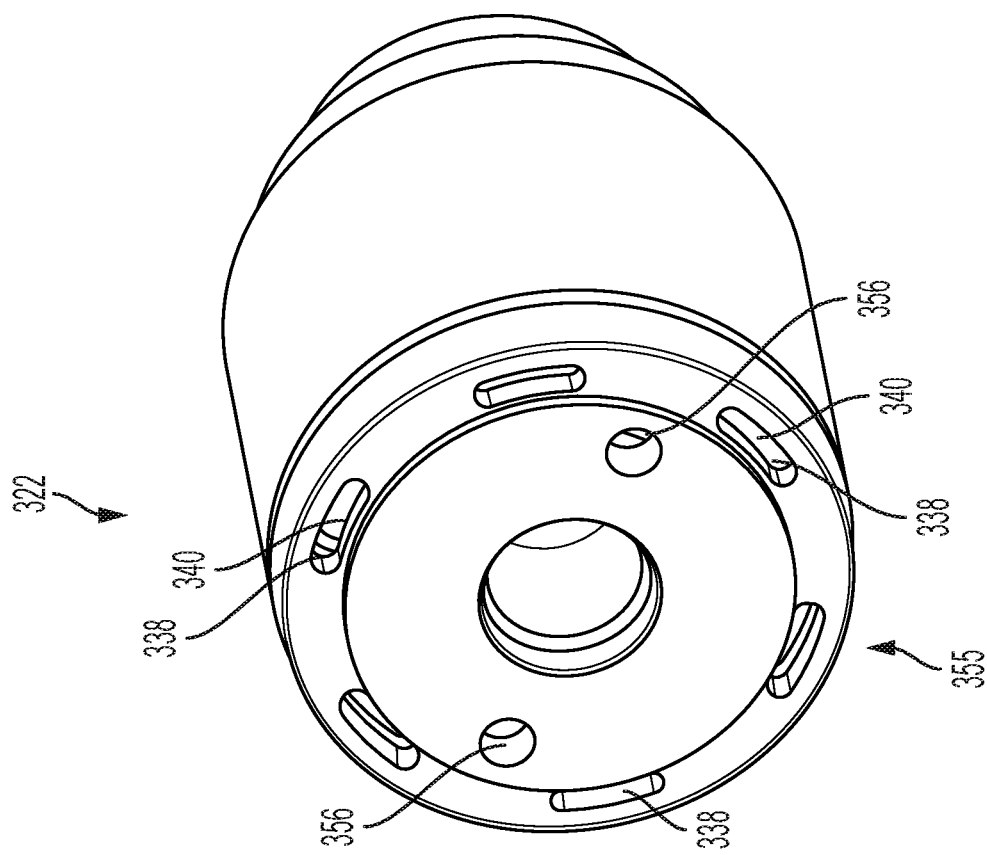
FIG. 18 is a rear perspective view of the chuck of FIG. 16.
Figure 17:
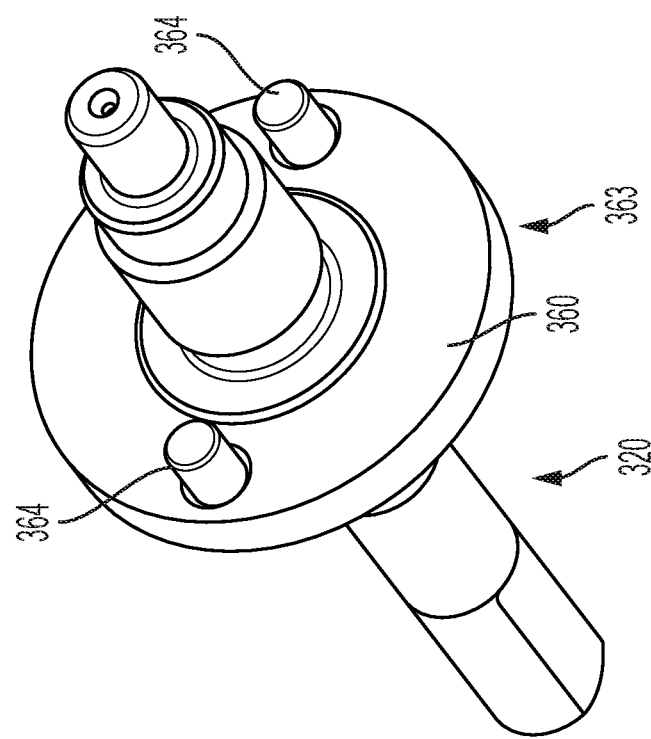
FIG. 17 is a front perspective view of the output shaft of FIG. 16.
Figure 19:
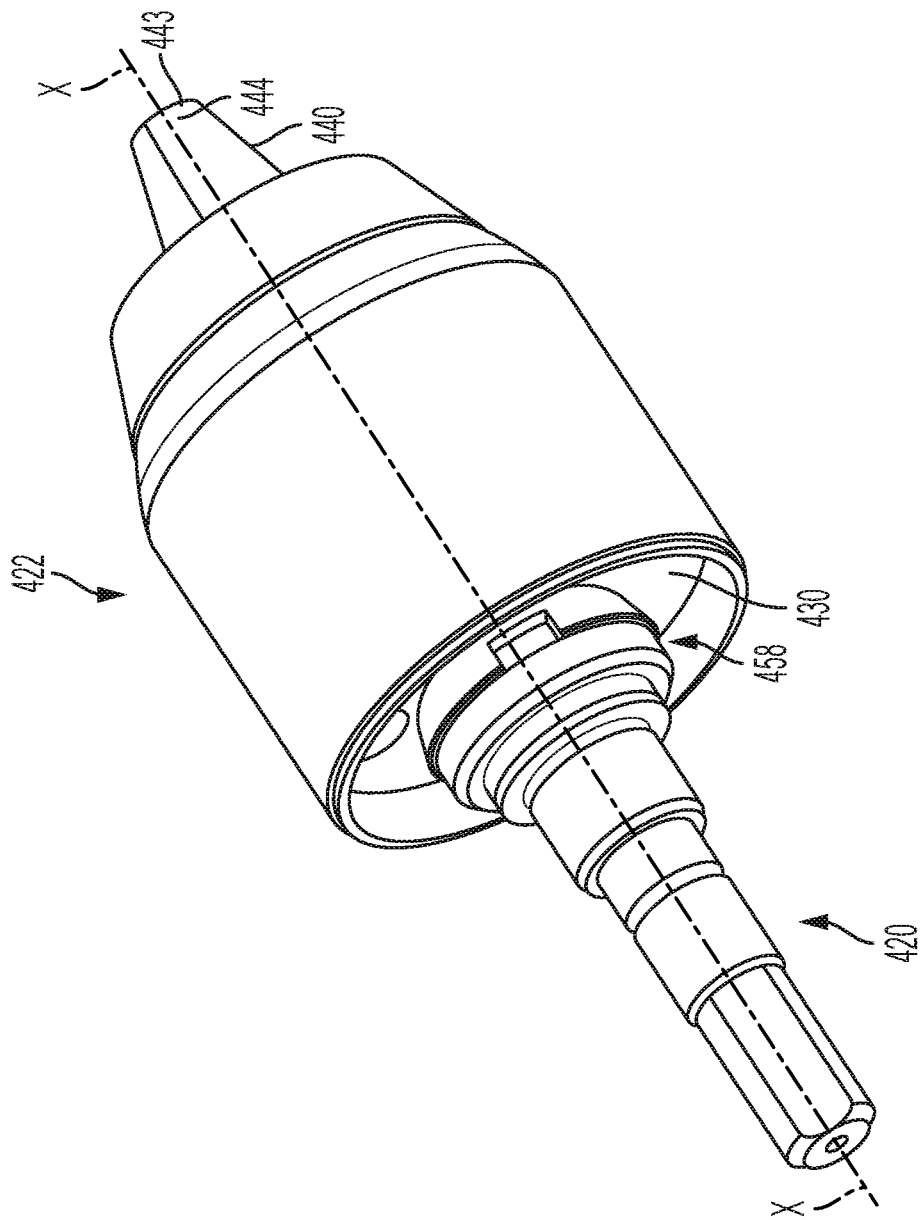
FIG. 19 is a perspective view of another embodiment of an output shaft of a power tool and a chuck.
Figure 20:
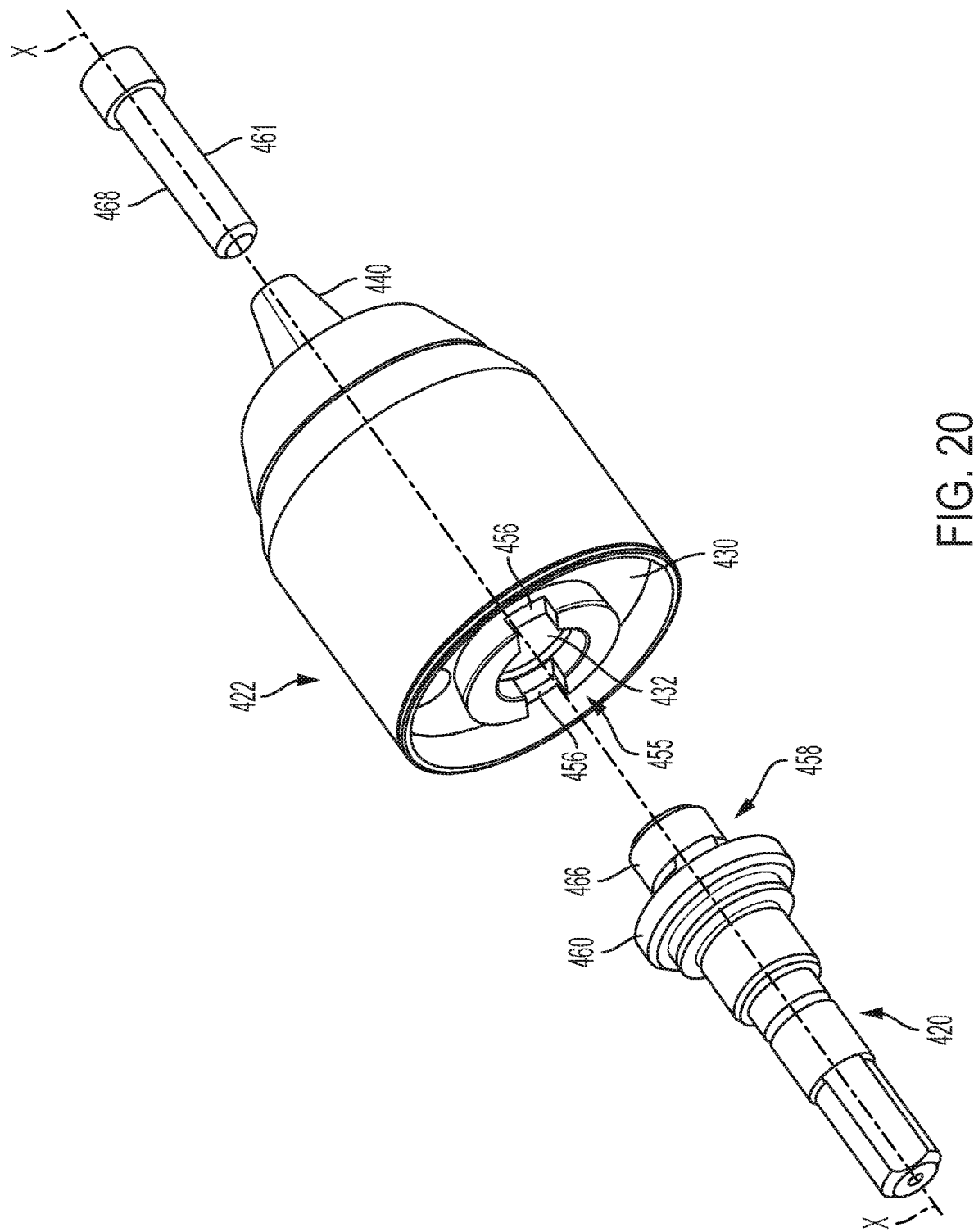
FIGS. 20 and 21 are exploded perspective views of the output shaft and chuck of FIG. 19.
Figure 21:
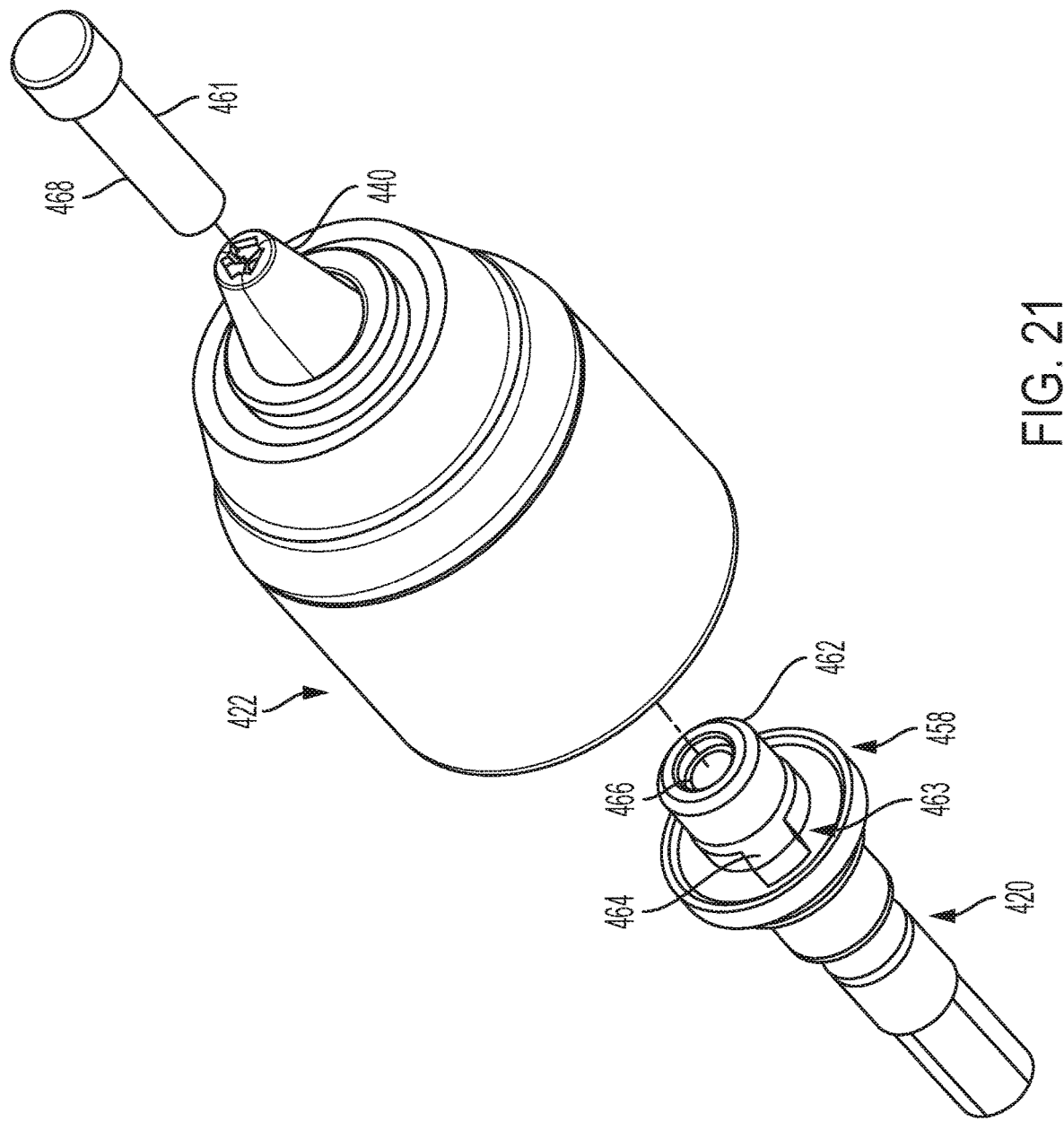
Figure 22:
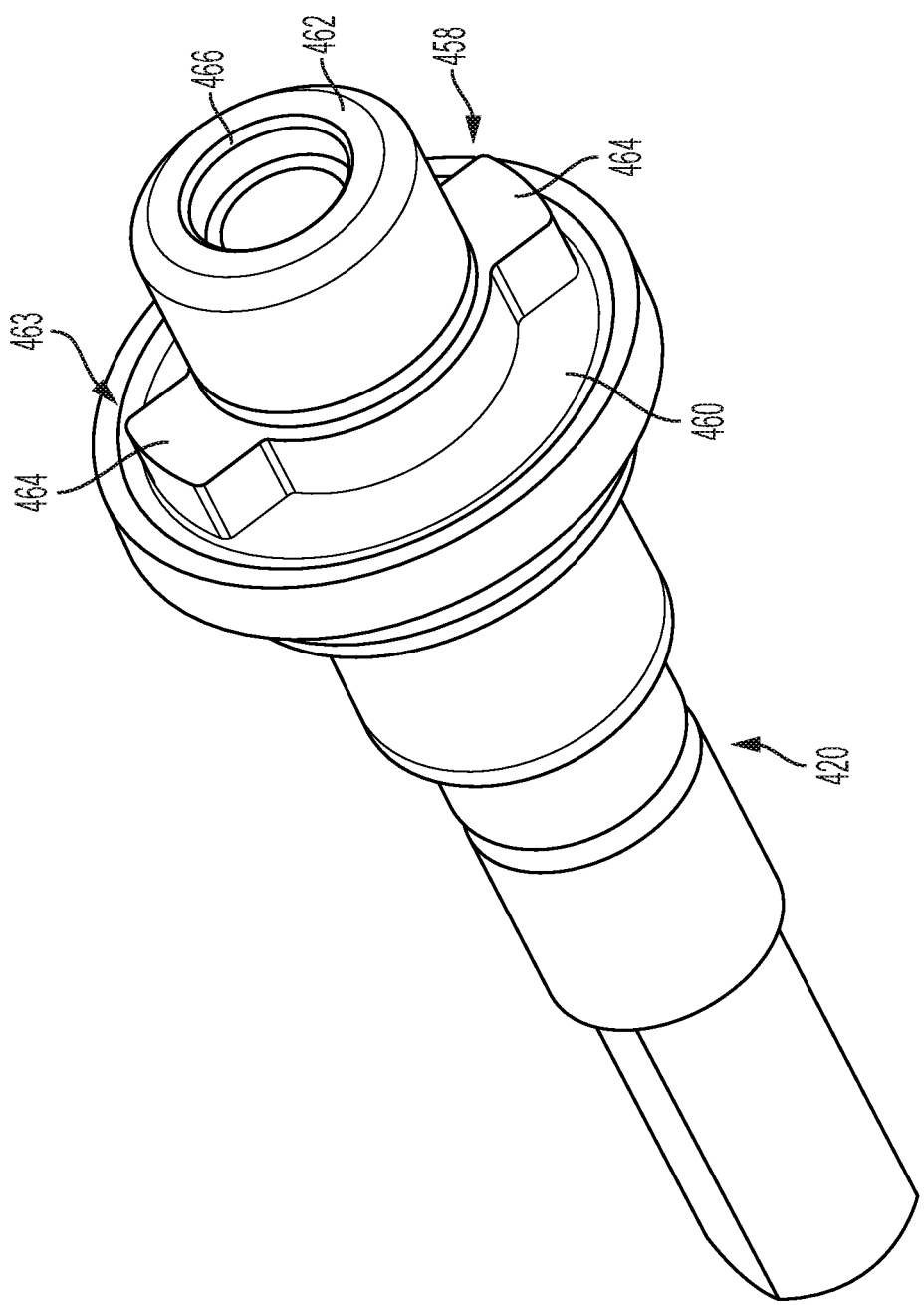
FIG. 22 is a front perspective view of the output shaft of FIG. 19.

Referring to FIGS. 16-18, in another embodiment, an output shaft 320 of a power tool and a chuck 322 have a similar design to the output shaft 220 and chuck 222 of FIGS. 13-15, except for the following differences in the first and second key drive members. In the embodiment of FIGS. 16-18, the first key drive member 355 comprises two axial bores 356 in the body 330 and the second key drive member 363 comprises two axial pins 364 disposed on a radial flange 360 on the output shaft 320. In another embodiment, the bores and the pins may be tapered or angled relative to the longitudinal axis. The bores 356 receive the pins 364 to non-rotationally couple the body 330 to the output shaft 320. The bores 356 and the pins 364 are angularly spaced about the longitudinal axis (e.g., equally angularly spaced at 180° intervals) and are each angularly spaced from each of the angled passageways 338 that receive the jaws 340, enabling the jaws 340 to be further retracted into the body and reducing the axial length of the body. For example, in the illustrated embodiment, there are three passageways 338 spaced at equal 120° intervals, and two bores 356 spaced at equal 180° and spaced from two of the passageways by 30° and from the third passageway by 90°.

Referring to FIGS. 19-24, in another embodiment, an output shaft 420 of a power tool and a chuck 422 have a similar design to the output shaft 20 and chuck 22 of FIGS. 3-8. The chuck 422 has a chuck body 430 with jaws 440 moveable in angled passageways 438 between a front clamping position and a rear retracted position (similar to the body 30 and jaws 40 of the chuck 22 of FIGS. 3-8). Each jaw 440 has a rear end 445 and a front end 443 with a clamping surface 444 configured to clamp a tool bit received in a central bore 431. The rear end of at least one of the jaws 440 lies in a first plane P1 that is transverse to the longitudinal axis X. In an embodiment, the rear ends of all the jaws 440 are co-planar and lie in the first plane P1. In another embodiment, the rear ends of the jaws are not co-planar and the first plane is defined by the rearmost rear end of the jaws. The output shaft 420 has a front end 458 with a radial flange 460 and a central protrusion 462 (similar to the front end 58 with a radial flange 60 and central protrusion 62 of the output shaft 20 of FIGS. 3-8). The chuck body 430 includes a first key drive member 455 and the output shaft 430 includes a second key drive member 463 that differ from the first key drive member 55 and second key drive member 63 of FIGS. 3-8 as follows.

Figure 23:
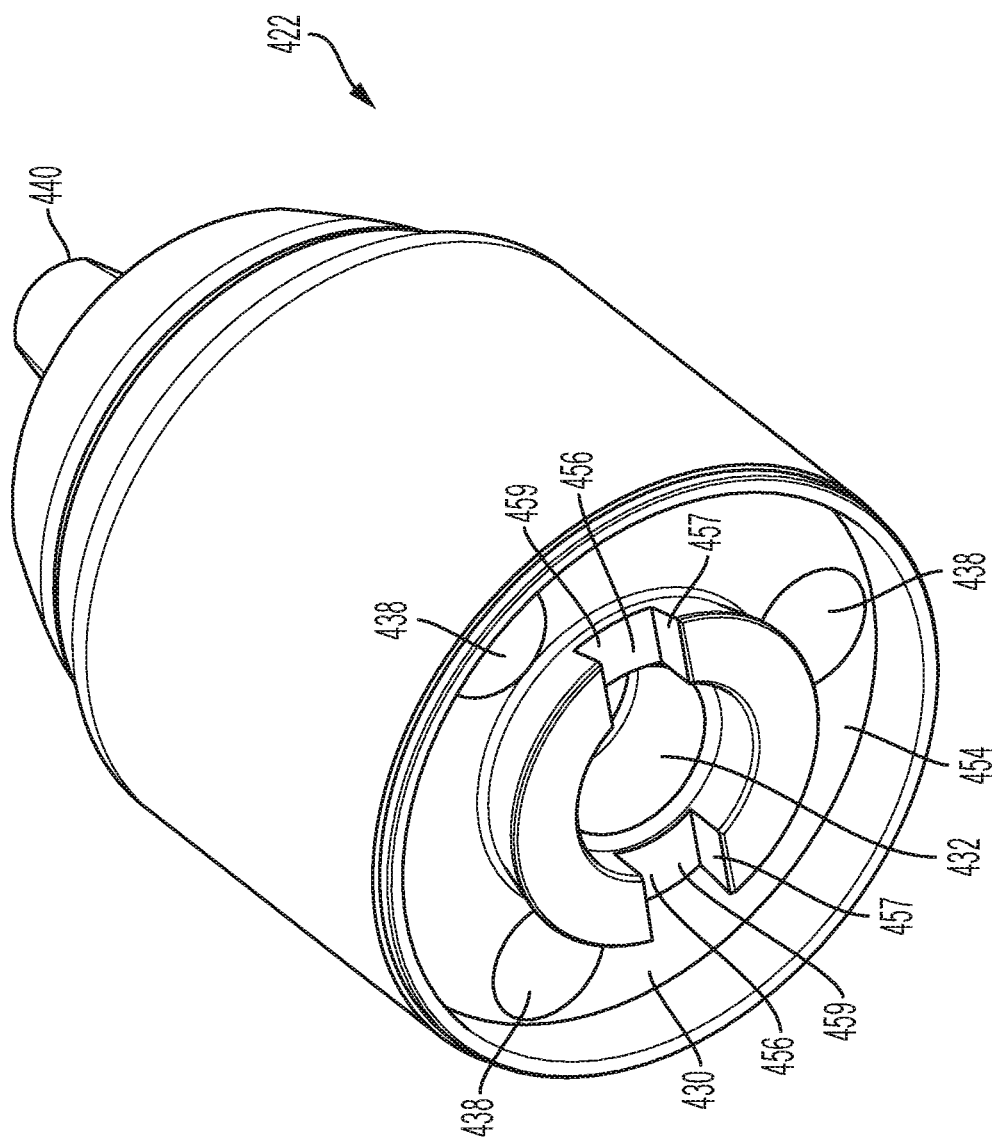
FIG. 23 is a rear perspective view of the chuck of FIG. 19.
Figure 24:
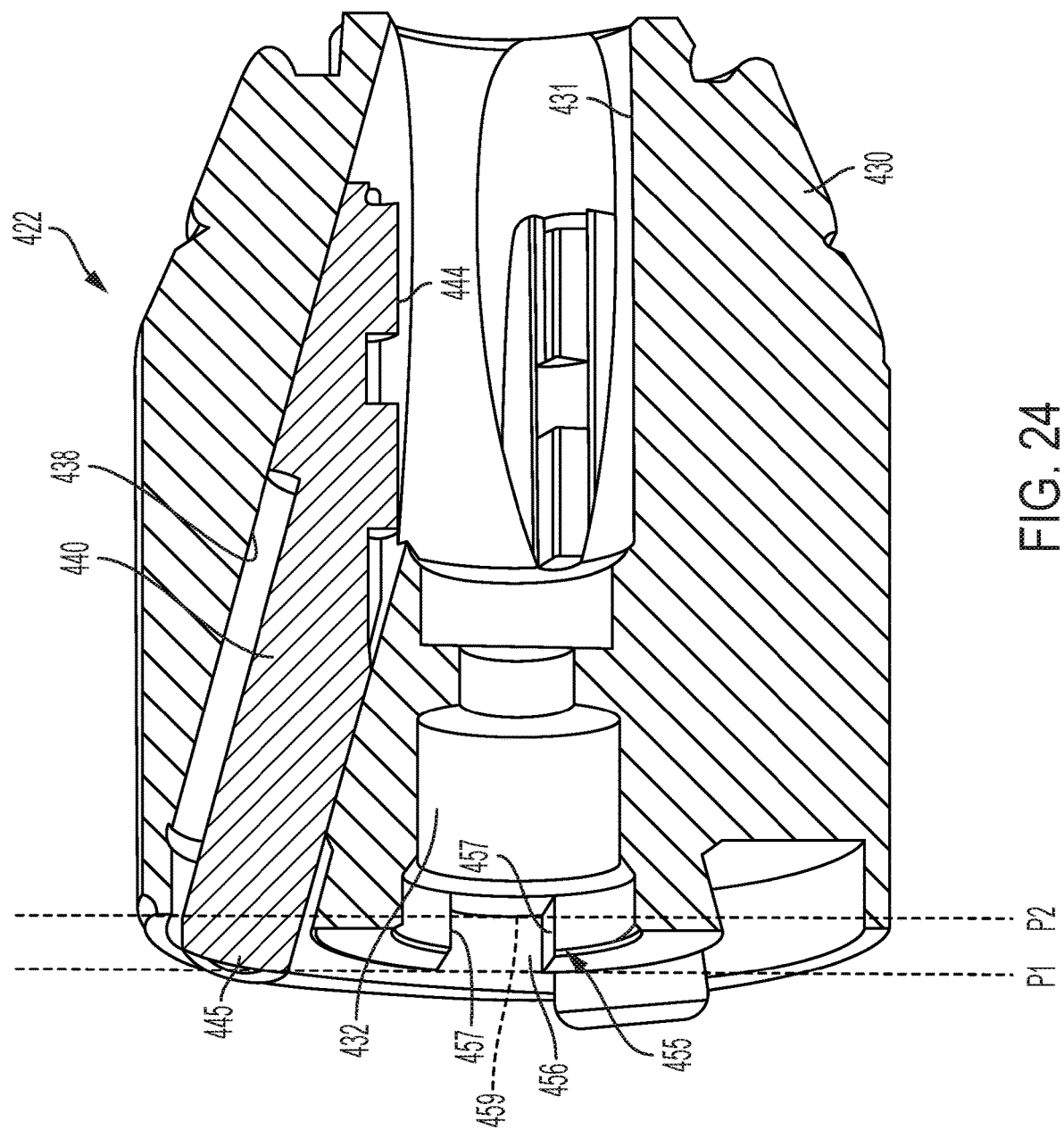
FIG. 24 is a cross-sectional view of the chuck of FIG. 19.

The first key drive member 455 comprises a two diametrically opposed radial slots 456 that extend radially outward from the central bore 432. Each slot 456 is defined by side walls 457 that are parallel to the longitudinal axis X and a base wall 459 that is transverse to the longitudinal axis X and that lies in the second plane P2. In another embodiment, the side walls 457 may be non-parallel to the longitudinal axis (e.g., so that they taper toward one another). The slots 456 each are angularly spaced from each other and about the longitudinal axis from each of the angled passageways 438 that receive the jaws 40. For example, the radial slots 456 are equal angularly spaced about the longitudinal axis X by 180° with each slot spaced equal angularly from one of the passageways 438 (e.g., by 15° to 45°). Angularly spacing the slots 456 from the passageways 438 enables the rear ends of the jaws 440 to be retracted axially rearward of the second plane P2 without the jaws 440 extending into the slots 456. In addition, as shown in FIG. 23, in an embodiment, each passageway 438 may be open to the rear end 454 of body 430 and the jaws 440 may be retracted beyond the rear end 454 of the body 430 into the sleeve. These features enable better torque transmission from the output shaft 420 to the body 430, while also reducing the axial length of the body 430 and of the chuck 422.

The second key drive member 463 includes two diametrically opposed radial projections 464 disposed on a front face of an optional flange 460 on the front end 458 of the output shaft 420. Each radial projection 464 extends radially outward from an optional central protrusion 462, which extends axially forward of the flange 460 along the longitudinal axis X. The projections 464 may be equal angularly spaced about the longitudinal axis from each other by the same angular distance as the radial slots 456 of the first key drive member 455 (e.g., spaced apart by 180°), so that the projections 464 may engage the slots 456 to non-rotationally couple the chuck 422 to the output shaft 420.

The chuck body 430 and the output shaft 420 may further include an axial fixation device 461 device configured to axially couple the chuck body 430 to the output shaft 420 to inhibit axial movement of the chuck 422 relative to the output shaft 420. In the illustrated embodiment, the axial fixation device 461 includes a threaded opening 466 defined in the central protrusion 462 and extending along the longitudinal axis X, and a threaded screw 468 that is received through the central bore 432 in the body 430 and is threaded into the threaded opening 466 in the shaft 420.

To couple the chuck 422 to the output shaft 420, the central protrusion 462 and the radial projections 464 on the shaft are received in the central bore 432 and the radial slots 456 in the chuck body 430. The radial projections 464 and radial slots 456 cause the chuck 422 to be non-rotationally coupled to the shaft 420 so that rotation of the shaft 420 causes rotation of the chuck 422. The chuck screw 468 is received through the central bore 432 in the body 430 and is threaded into the threaded opening 466 in the shaft 420 to prevent axial movement of the chuck 422 relative to the shaft 420.

In alternative embodiments, the output shaft and the chuck body may have a different number of radial projections and recesses, and the chuck may have a different number of jaws. In other alternative embodiments, radial projections may be provided on a rear end of the chuck body, and radial slots may be provided on a front end of the shaft. In yet other embodiments, a rear end of the chuck body may have at least one radial slot and at least one radial projection, and the front end of the shaft may have at least one radial projection and at least one radial slot. In another embodiment, the pins could be roll pins, self-collapsing pins, tapered pins, keys, or projections.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A chuck for a power tool comprising:
   a body extending along a longitudinal axis and having a nose portion and a tail portion,
   a central bore defined in the body and open to the nose portion, the central bore extending along the longitudinal axis and configured to receive a tool bit;
   a plurality of angled passageways defined in the body in communication with the central bore, with each passageway disposed at an angle to the longitudinal axis;
   a plurality of jaws, each jaw at least partially received in one of the passageways, at least one of the jaws having a rear end lying in a first plane transverse to the longitudinal axis, the jaws moveable in the passageways between an axially forward and radially inward clamping position to clamp the tool bit received in the central bore, and an axially rearward and radially outward retracted position;
   a rear central bore defined in the body; and
   a first key drive member coupled to the tail portion of the body and configured to be engaged by a second key drive member on an output shaft of the power tool to non-rotationally couple the body to the output shaft, where the first key drive member extends axially from a rearward end to a forward end that lies in a second plane transverse to the longitudinal axis, wherein the second plane is axially forward of the first plane when the jaws are in the retracted position, and wherein the passageways are angularly spaced about the longitudinal axis and the first key drive member is angularly spaced about the longitudinal axis from each of the passageways.

2. The chuck of claim 1, wherein the first key drive member comprises a recess defined in the tail portion of the body.

3. The chuck of claim 2, wherein the recess comprises a radial slot that extends radially outward from the longitudinal axis, the radial slot having side walls and a base wall extending transverse to the longitudinal axis and lying in the second plane, the radial slot configured to be engaged by a radial projection on the output shaft of the power tool.

4. The chuck of claim 2, wherein the recess comprises an axial bore having a front end that lies in the second plane.

5. The chuck of claim 4, wherein the second key drive member comprises a second bore in the output shaft and further comprising a pin received in the axial bore and the second bore.

6. The chuck of claim 4, wherein the second key drive member comprises a projection extending axially from the output shaft that is received in the axial bore.

7. The chuck of claim 1, wherein the first key drive member comprises a projection coupled to the tail portion of the body and the second key drive member comprises a recess in the output shaft, the projection extending from a base wall on the tail portion of the body that lies in the second plane and configured to engage the recess in the output shaft.

8. The chuck of claim 1, wherein the first key drive member comprises a plurality of first key drive members angularly spaced about the longitudinal axis and each spaced from the passageways.

9. The chuck of claim 1, wherein each passageway is open to the tail portion of the body.

10. The chuck of claim 9, wherein each jaw may be retracted axially rearwardly beyond the tail portion of the body.

11. The chuck of claim 1, further comprising a rear axial bore defined in the tail portion of the body and configured to receive a central portion of the output shaft, where the first key drive member is disposed radially outward from the rear axial bore and the second key drive member is disposed radially outward from the central portion of the output shaft.

12. The chuck of claim 1, wherein the first key drive member is unthreaded.

13. A power tool comprising:
a housing;
a motor received in the housing;
a switch configured to selectively actuate the motor;
an output shaft extending along a longitudinal axis and configured to be rotationally driven by the motor, the output shaft having a front end;
a chuck configured to be coupled to the output shaft, the chuck including a body extending along the longitudinal axis and having a nose portion and a tail portion, a central bore defined in the body and open to the nose portion, the central bore extending along the longitudinal axis and configured to receive a tool bit, a plurality of angled passageways defined in the body in communication with the central bore, with each passageway disposed at an acute angle to the longitudinal axis, and a plurality of jaws, each jaw at least partially received in one of the passageways, a rear end of at least one of the jaws lying in a first plane transverse to the longitudinal axis, the jaws moveable in the passageways between an axially forward and radially inward clamping position to clamp the tool bit received in the central bore, and an axially rearward and radially outward retracted position; and a first key drive member coupled to the tail portion of the body and a second key drive member coupled to the output shaft, the first and second key drive members configured to engage each other to non-rotationally couple the body to the output shaft so that rotation of the output shaft causes rotation of the body, wherein the first key drive member extends from a rearward end to a forward end that lies in a second transverse plane transverse to the longitudinal axis, wherein the second plane is axially forward of the first plane when the jaws are in the retracted position, and wherein each passageway is open to the tail portion of the body.

14. The power tool of claim 13, wherein the first key drive member comprises a recess defined in the tail portion of the body.

15. The power tool of claim 14, wherein the recess comprises a radial slot that extends radially outward from the longitudinal axis, the radial slot having side walls and a base wall extending transverse to the longitudinal axis and lying in the second plane, the radial slot configured to be engaged by a radial projection on the output shaft of the power tool.

16. The power tool of claim 14, wherein the recess comprises an axial bore having a front end that lies in the second plane.

17. The power tool of claim 16, wherein the second key drive member comprises a second bore in the output shaft and further comprising a pin received in the axial bore and the second bore.

18. The power tool of claim 16, wherein the second key drive member comprises a projection extending axially from the output shaft that is received in the axial bore.

19. The power tool of claim 13, wherein the first key drive member comprises a projection coupled to the tail portion of the body and the second key drive member comprises a recess in the output shaft, the projection extending from a base wall on the tail portion of the body that lies in the second plane and configured to engage the recess in the output shaft.

20. The power tool of claim 13, wherein the passageways are angularly spaced about the longitudinal axis and the first key drive member comprises a plurality of first key drive members angularly spaced about the longitudinal axis and each spaced from the passageways.

21. The power tool of claim 13, wherein each jaw may be retracted axially rearwardly beyond the tail portion of the body.

22. The power tool of claim 13, wherein the passageways are angularly spaced about the longitudinal axis and the first key drive member is angularly spaced about the longitudinal axis from each of the passageways.

23. The power tool of claim 13, further comprising a rear axial bore defined in the tail portion of the body and configured to receive a central portion of the output shaft, where the first key drive member is disposed radially outward from the rear axial bore and the second key drive member is disposed radially outward from the central portion of the output shaft.

24. The power tool of claim 13, wherein the first key drive member is unthreaded.

\* \* \* \* \*